US007261493B2

(12) United States Patent
Wilkinson

(10) Patent No.: US 7,261,493 B2
(45) **Date of Patent: *Aug. 28, 2007**

(54) DEVICE AND METHOD FOR LAYING AND JOINING PIPE

(75) Inventor: Ivan R. Wilkinson, Emmett, ID (US)

(73) Assignee: Trenchcraft, Inc., Boise, ID (US)

( * ) Notice: Subject to any disclaimer, the term of this patent is extended or adjusted under 35 U.S.C. 154(b) by 152 days.

This patent is subject to a terminal disclaimer.

(21) Appl. No.: 11/101,228

(22) Filed: Apr. 7, 2005

(65) Prior Publication Data

US 2005/0180821 A1 Aug. 18, 2005

Related U.S. Application Data

(63) Continuation-in-part of application No. 11/004,554, filed on Dec. 3, 2004, now Pat. No. 7,037,042.

(60) Provisional application No. 60/528,318, filed on Dec. 8, 2003.

(51) Int. Cl.
*F16L 1/028* (2006.01)

(52) U.S. Cl. .................... 405/184; 405/174; 405/154.1

(58) Field of Classification Search ............. 405/154.1, 405/174, 179, 184, 184.4, 184.5
See application file for complete search history.

(56) References Cited

U.S. PATENT DOCUMENTS

| | | | | |
|---|---|---|---|---|
| 3,034,668 | A | 5/1962 | Wicks | 414/508 |
| 3,565,269 | A | 2/1971 | Martin | 405/177 |
| 3,858,731 | A | 1/1975 | Briggs | 29/781 |
| 3,956,901 | A | 5/1976 | Brown | 405/184.5 |
| 4,094,152 | A | 6/1978 | Jutte | 405/184 |
| 4,274,758 | A | 6/1981 | Schosek | 405/184 |
| 4,362,435 | A | 12/1982 | Henry | 405/154 |
| 4,571,122 | A | 2/1986 | Yamamoto et al. | 405/184 |
| 4,682,912 | A | 7/1987 | Henry | 405/154 |
| 4,741,646 | A | 5/1988 | Hatch | 405/175 |
| 5,174,685 | A | 12/1992 | Buchanan | 405/179 |
| 5,219,265 | A | 6/1993 | Recker | 414/731 |
| 5,232,502 | A | 8/1993 | Recker | 118/317 |
| 5,368,413 | A | 11/1994 | Moore | 405/154 |
| 5,452,969 | A | 9/1995 | Crook | 405/303 |
| 5,522,699 | A | 6/1996 | Smith | 405/154 |
| 5,707,175 | A | 1/1998 | Geelhoed | 405/180 |
| 5,795,101 | A | 8/1998 | Bill | 405/154 |
| 6,318,952 | B1 | 11/2001 | Waggoner | 414/745.4 |
| 6,540,095 | B2 | 4/2003 | Haringer | 212/242 |
| 6,543,551 | B1 | 4/2003 | Sparks et al. | 175/52 |
| 7,037,042 | B2 * | 5/2006 | Wilkinson | 405/184 |

* cited by examiner

*Primary Examiner*—Frederick L. Lagman
(74) *Attorney, Agent, or Firm*—Joseph W. Holland

(57) ABSTRACT

A pipe installation device and a method for laying consecutive lengths of bell and spigot pipe. The pipe installation device installs sequential pipe lengths. The pipe installation device includes a pipe supply system and a pipe alignment system attached to a carriage. The pipe alignment system is positioned to receive a pipe length from the pipe supply system and align the pipe length with a pipe length previously positioned in the pipe alignment system. The pipe installation device also includes a pipe joining system for joining the two pipe lengths positioned in the pipe alignment system. A pipe restraint system applies a restraining force against one pipe length while the pipe joining system joins the two pipe lengths.

18 Claims, 23 Drawing Sheets

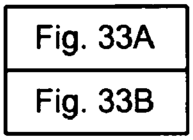
FIG. 33
FIG. 33A
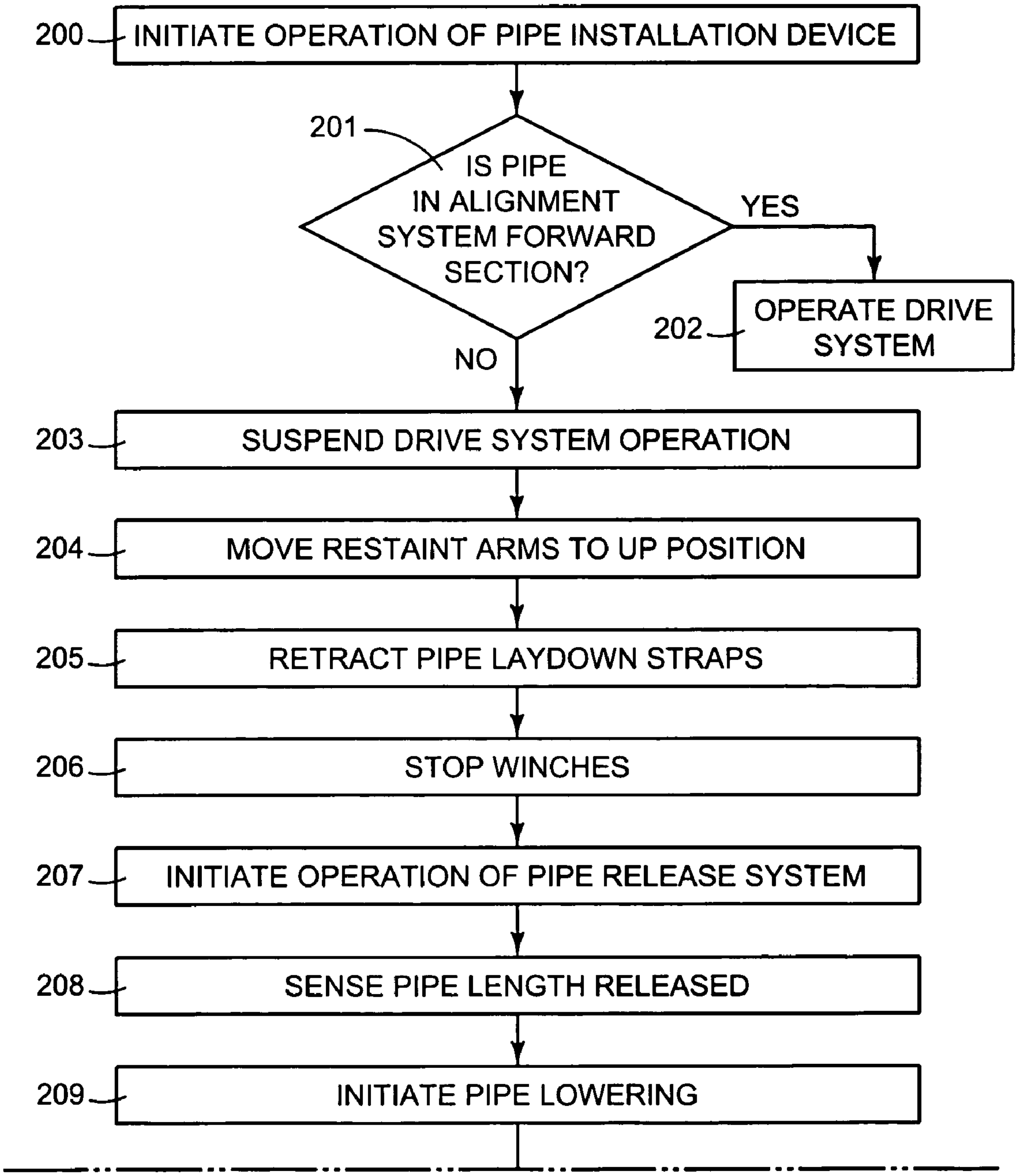

DEVICE AND METHOD FOR LAYING AND JOINING PIPE

The present application is a Continuation-in-Part Application of a non-provisional application Ser. No. 11/004,554 entitled *Device and Method for Laying and Joining Pipe* filed Dec. 3. 2004, now U.S. Pat. No. 7,037,042, which claims the benefit of the filing date of a Provisional Patent Application Ser. No. 60/528,318, filed on Dec. 8, 2003. entitled *Automated Pipe Laying Device*, which are incorporated by reference herein.

BACKGROUND OF THE INVENTION

1. Technical Field

The present invention relates generally to devices for laying pipe and, more specifically, to a device that advances along the course of pipeline construction, lays and joins pipe.

2. Background of the Invention

The process of laying sections of pipe along the course of pipeline construction when a bell and spigot pipe is being installed, involves laying sequential pipe lengths and the joining the sequential pipe lengths by applying a mechanical pressure to a most recently laid section of pipe in order to engage the spigot end of that length with the bell end of a previously laid length. When the course of pipeline construction lies underground, construction involves the excavation of a trench to a desired depth followed by placement and positioning of pipe in the trench. This method involves placing one or more workers in the trench to guide a lowered section of pipe into contact with a previously installed section. The workers must also disengage rigging from the pipe that was used in lowering the length into the trench. Once a pipe length is positioned in the trench, it is manually joined to a preceding pipe length. In deep trenches, a work crew commonly works within the confines of a trench shoring box that provides increased safety in the trench working condition.

Excavation and placement functions are typically performed by a single piece of equipment, an excavator. The excavator is a relatively costly piece of equipment, often track mounted, that performs primarily an excavation function. One disadvantage of the current popular method is the fact that a costly piece of equipment is oftentimes moved between tasks, excavation and pipe installation, that may otherwise proceed at different rates. Additionally, where shoring is required it is often moved along the length of the trench by the excavator as the pipeline advances requiring yet a third function or task of the excavator.

Devices, including excavators that position or otherwise place pipe at the bottom of a trench, pose a number of disadvantages. These devices are positioned outside the trench and typically place pipe by maneuvering along a top edge of the trench over tailings that have been placed alongside the trench during excavation. These surfaces are rarely, if ever, flat and therefore make the task of placement more difficult. Additionally, activity at grade level, depending on soil conditions, may increase a probability of trench collapse. Additional problems are seen when laying bell and spigot pipe. For instance, manufacturer's and job specifications typically require that the spigot end of a first pipe length be inserted into a bell end of a sequential pipe length a specified distance and that the spigot end not be "bottomed" out in the bell end when inserted. Additionally, manufacturer's and job specifications typically require that when the pipe is laid on a substrate that a "divot" be provided for the bell end to lay in so that undue stress is not created in the pipe at the transition of the bell to the barrel of the pipe due to the differing diameters of the bell and the barrel portions of the pipe.

Advantage may therefore be found in providing a device that is capable of laying and joining pipe in a trench. Additional advantage may be found in providing an apparatus that advances along the course of pipeline construction, for instance a pre-excavated trench, laying and joining pipe in the trench. Advantage may also be found in providing a device that aligns sequential lengths of bell and spigot pipe and seats a spigot end of a first pipe length into the bell end of a sequential pipe length. Additional advantage may be found in providing an apparatus that provides a divot for the bell to lie in as the device proceeds along the course of pipeline construction.

SUMMARY OF THE INVENTION

These and other objectives are met by the pipe installation device of the present invention. As such, the present invention is directed to a pipe installation device for installing sequential pipe lengths along the course of pipeline construction, the device including a carriage carriage movable along the course of pipeline construction. A pipe supply system and a pipe alignment system are attached to the carriage, the pipe alignment system positioned to receive a pipe length from the pipe supply system and align the pipe length with a pipe length previously positioned in the pipe alignment system. The pipe alignment system includes a pipe restraint system adapted to selectively apply a restraining force against one of the pipe lengths and a pipe joining system adapted to join the pipe lengths in the pipe alignment systems. The pipe installation device also includes a power supply adapted to provide power to the pipe feed and pipe alignment systems and a control system adapted to control the pipe feed, and pipe alignment systems. The preferred embodiment of the invention also includes a drive system adapted for advancing the pipe installation device along the course of pipeline construction and a steering system adapted to steer the carriage along the course of pipeline construction, both connected to the carriage. In addition, the preferred embodiment includes a trench sidewall sensing system connected to the carriage and provides an output to the control system representative of the location of the trenc with regard to the carriage.

In the preferred embodiment, the pipe supply system includes a pipe storage rack adapted to hold one or more pipe lengths, a pipe release mechanism adapted to selectively release a single pipe length from the pipe storage rack and a pipe feed system adapted to lower the pipe length released from the pipe rack onto the pipe alignment system.

Alternately, the present invention is directed to a pipe alignment system adapted to receive a first pipe length from a pipe feed mechanism in a forward section of the pipe alignment system, hold the first pipe length in a linearly aligned relationship to a second pipe length positioned on a rearward section of the pipe alignment system and join a spigot end of the first pipe length to a bell end of the second pipe length by inserting the spigot end of the first pipe length into the bell end of the second pipe length a specified distance.

In the preferred embodiment, the pipe joining system of the pipe installation device includes a pipe seating ram adapted to exert a force against a forward end of the pipe length positioned in the pipe alignment system forward section, the force substantially parallel to a longitudinal axis of the pipe length positioned in the pipe alignment system forward section. The force exerted by the pipe seating ram is adjustable or variable so that various pipe diameters may be accommodated and so that sufficient force is applied to insert a spigot end of the forward pipe length into the bell end of the rearward or trailing pipe length. Ideally, the force applied should be sufficient to overcome the resistance of a gasket positioned in a gasket race of the bell to insertion of the spigot end, but not so great so as to "bottom out" the spigot in the bell. A pipe restraint system selectively operates either to allow rearward movement of the rearward pipe length relative to the forward advancement of the pipe installation device or, to restrain the rearward pipe length against rearward movement relative to the forward advancement of the pipe installation device.

The present invention is also directed to a method for laying consecutive lengths pipe using an pipe installation device including the steps of advancing the pipe installation device along the course of pipeline construction, feeding a pipe length onto a forward section of a pipe alignment system, aligning the pipe length with a pipe length positioned on a rearward section of the pipe alignment system, restraining the pipe length positioned on a rearward section of the pipe alignment system against rearward movement, joining the pipe length in the forward section of the pipe alignment system by exerting a force against the pipe length positioned on the forward section of a pipe alignment system substantially along a longitudinal axis of the pipe length and consequently against the previously laid pipe length positioned in the rearward section of the pipe alignment system so that a spigot end of one of the pipe length in the forward section of a pipe alignment system engages a bell end of the pipe length positioned in the rearward section of the pipe alignment system.

Once the pipe length in the forward section of a pipe alignment system and the pipe length positioned in the rearward section of the pipe alignment system are joined, restraint of the pipe length positioned in the rearward section of the pipe alignment system is discontinued and forward travel of the pipe installation device resumes. The joined pipe lengths including the pipe length positioned in the forward section of a pipe alignment system and the pipe length positioned in the rearward section of the pipe alignment system are deposited at a rear end of the pipe alignment system as the pipe installation device resumes its forward travel.

The present invention consists of the parts hereinafter more fully described, illustrated in the accompanying drawings and more particularly pointed out in the appended claims, and methods for laying consecutive lengths pipe using an pipe installation device, it being understood that changes may be made in the form, size, proportions and minor details of construction without departing from the spirit or sacrificing any of the advantages of the invention.

BRIEF DESCRIPTION OF THE DRAWINGS

FIGS. 33A and 33B are a schematic flow diagrams depicting operation of the pipe installation device according to a preferred embodiment of the present invention.

DETAILED DESCRIPTION

Figure 1:
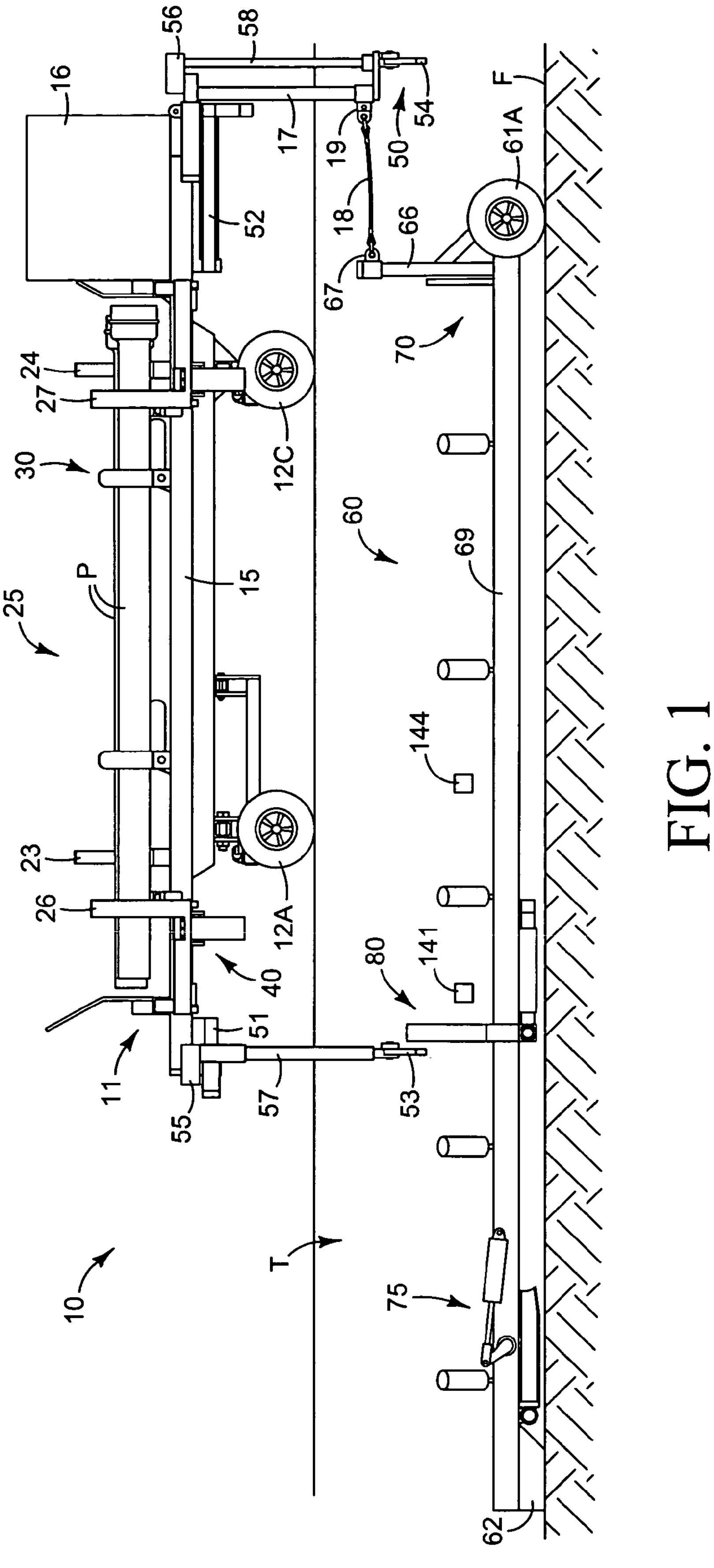
FIGS. 1, 6, 9, 11 and 12 are representative side elevations depicting a pipe installation device according to a preferred embodiment of the present invention.

FIGS. 1, 6, 9, 11 and 12 are side elevations showing pipe installation device 10 to advantage. Pipe installation device 10 includes carriage 11 including frame 15 supported by a plurality of wheels, wheels 12A and 12C being shown in the referenced figures. Pipe installation device 10 also includes pipe supply system 20 and power and control systems housing 16 shown supported by carriage 11. Frame 15 includes a pair of swing arms 51 and 52 which extend laterally from frame 15. Trench sidewall sensing system 50 is shown connected to and supported by swing arms 51 and 52. Trench sidewall sensing system 50 senses a location of trench T relative to the position of carriage 11. FIGS. 1, 6, 9, 11 and 12 show trench sidewall sensing system 50 including angular motion sensors 55 and 56 positioned at the upper ends of swing arms 51 and 52 respectively. Control arms 57 and 58, depend from swing arms 51 and 52 and sidewall contact paddles 53 and 54 are connected at the distal ends of control arms 57 and 58 respectively. FIGS. 1, 6, 9, 11 and 12 also show sensors 141 which senses when a pipe length positioned in the forward portion of pipe alignment frame 69 has passed the location of sensor 141 and sensor 144 which senses when a pipe length been lowered onto the forward portion of pipe alignment frame 69.

Pipe supply system 20 is shown including pipe storage rack 25, pipe release mechanism 30, pipe feed system 40. Pipe storage rack 25 includes uprights 23 and 24 and pipe feed system 40 includes catch arms 26 and 27 all of which aide in containing pipe lengths in pipe supply system 20. Pipe release mechanism 30 is adapted to selectively release a single pipe length P from pipe storage rack 25 to pipe feed system 40 which is adapted to lower a pipe length P released from pipe rack 25 onto pipe alignment system 60. Pipe alignment system 60 is shown positioned on floor F of trench T and attached at upright 66 to carriage 11 by tow bar 17 and cable 18. Shear pin 19 attaches cable 18 to tow bar 17 so that in the event that pipe alignment system 60 becomes bound for any reason and cannot advance with carriage 11, shear pin 19 will fail without damaging components of either pipe alignment system 60 or carriage 11. Pipe alignment system 60 is shown supported by wheel 61A and skid 62. Pipe joining system 70 and pipe restraint system 80 are shown carried by pipe alignment frame 69 of pipe alignment system 60. Bell divot system 75 is shown carried by pipe alignment system 60.

Figure 2:
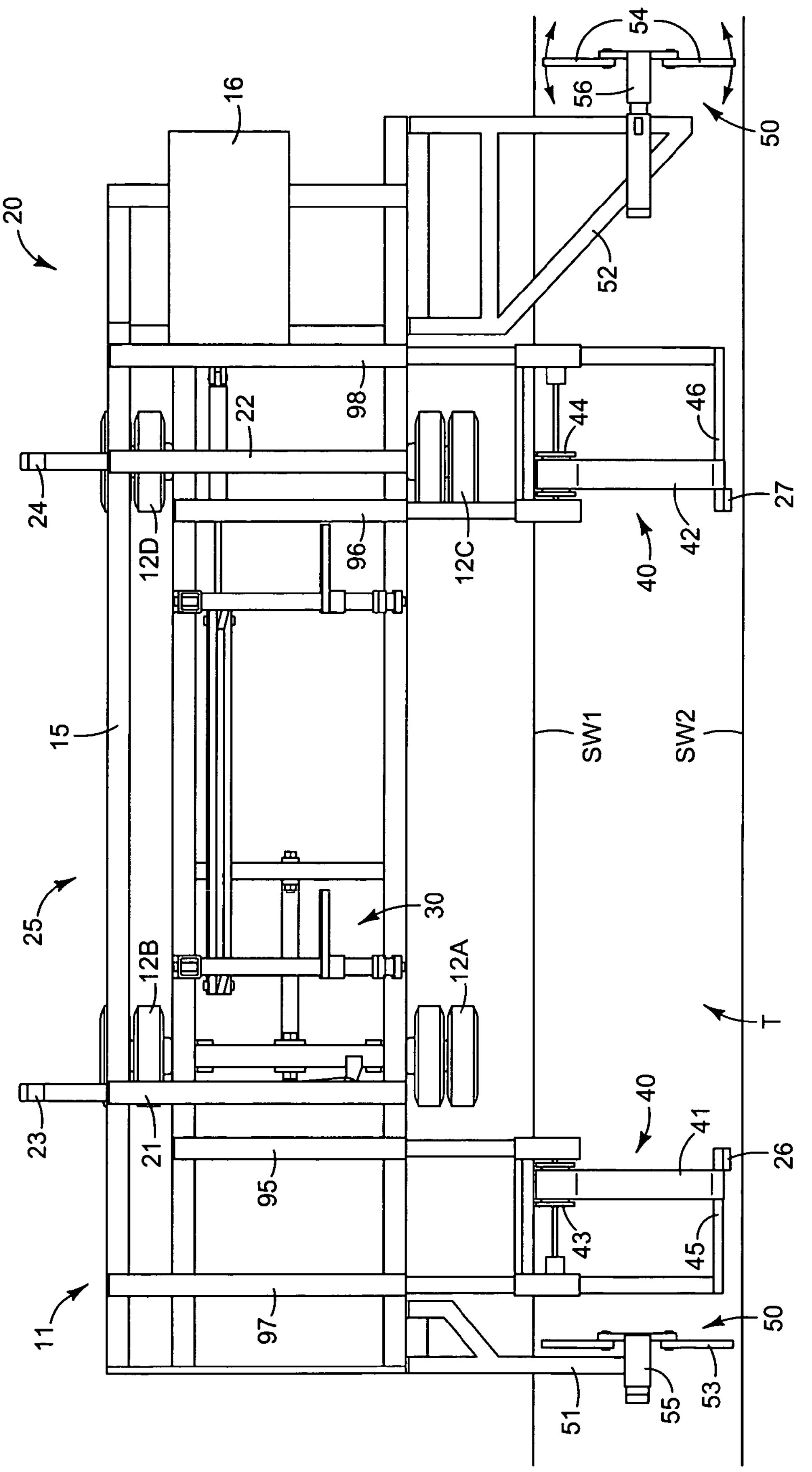
FIG. 2 is a representative top elevation depicting a carriage of a pipe installation device according to a preferred embodiment of the present invention.
Figure 4:
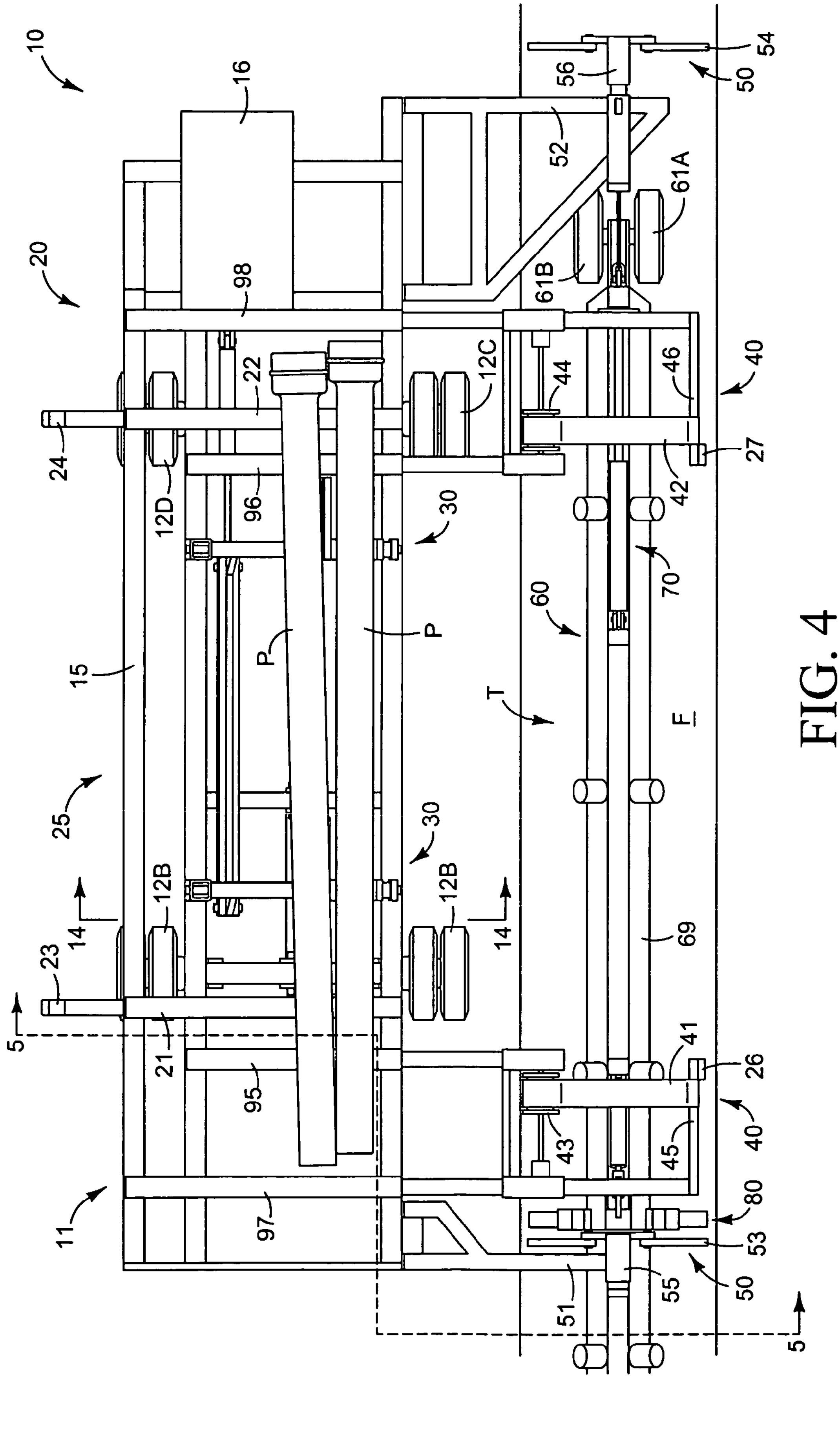
FIGS. 4 and 7 are representative top elevations depicting a pipe installation device according to a preferred embodiment of the present invention.
Figure 7:
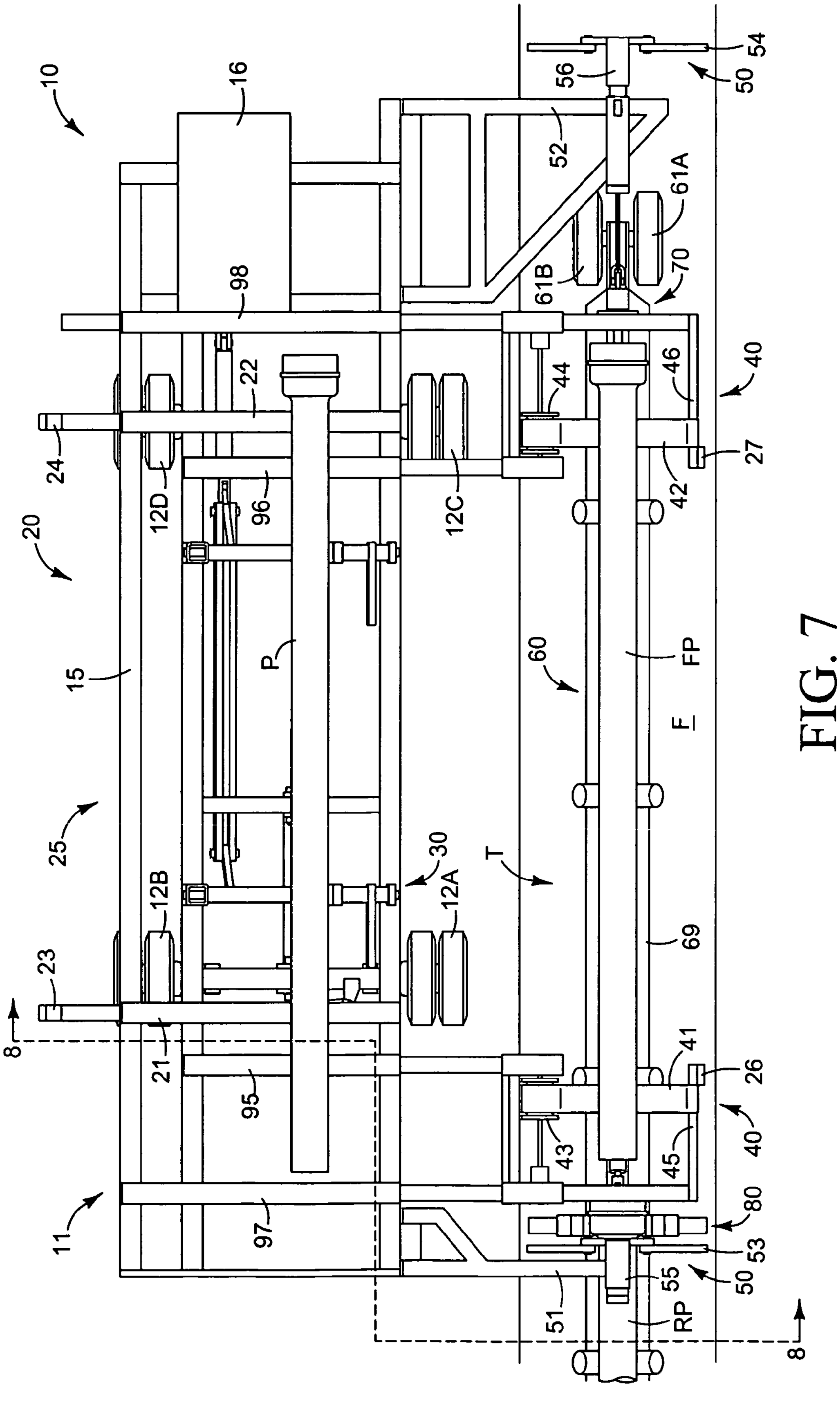

FIGS. 2, 4 and 7 are top plan elevations of carriage 11 including frame 15 supported by wheels 12A through 12D. FIGS. 4 and 7 show pipe alignment system 60 positioned in trench T. Referring now to FIGS. 2, 4 and 7, pipe supply system 20 is shown including pipe storage rack 25, pipe release mechanism 30, pipe feed system 40. Power and control systems housing 16 and trench sidewall sensing system 50 are shown connected to and supported by frame 15. Frame 15 includes inclined cross-frame members 95, 96, 97 and 98. Pipe supply system 20 includes first inclined rail 21 and second inclined rail 22. Uprights 23 and 24 restrict lateral movement or shifting of pipe off of pipe rack 25. When pipe is released from pipe rack 25 by pipe release mechanism 30, as described below, catch arms 26 and 27 restrict lateral movement or loss of pipe from pipe feed system 40. Pipe feed system 40 is shown including winches 43 and 44, straps 41 and 42 which may be extended and retracted by winches 43 and 44. A second end of straps 41 and 42 are attached to arms 45 and 46 respectively. Catch arms 26 and 27 are connected and extend from arms 45 and 46 respectively.

Figure 32:
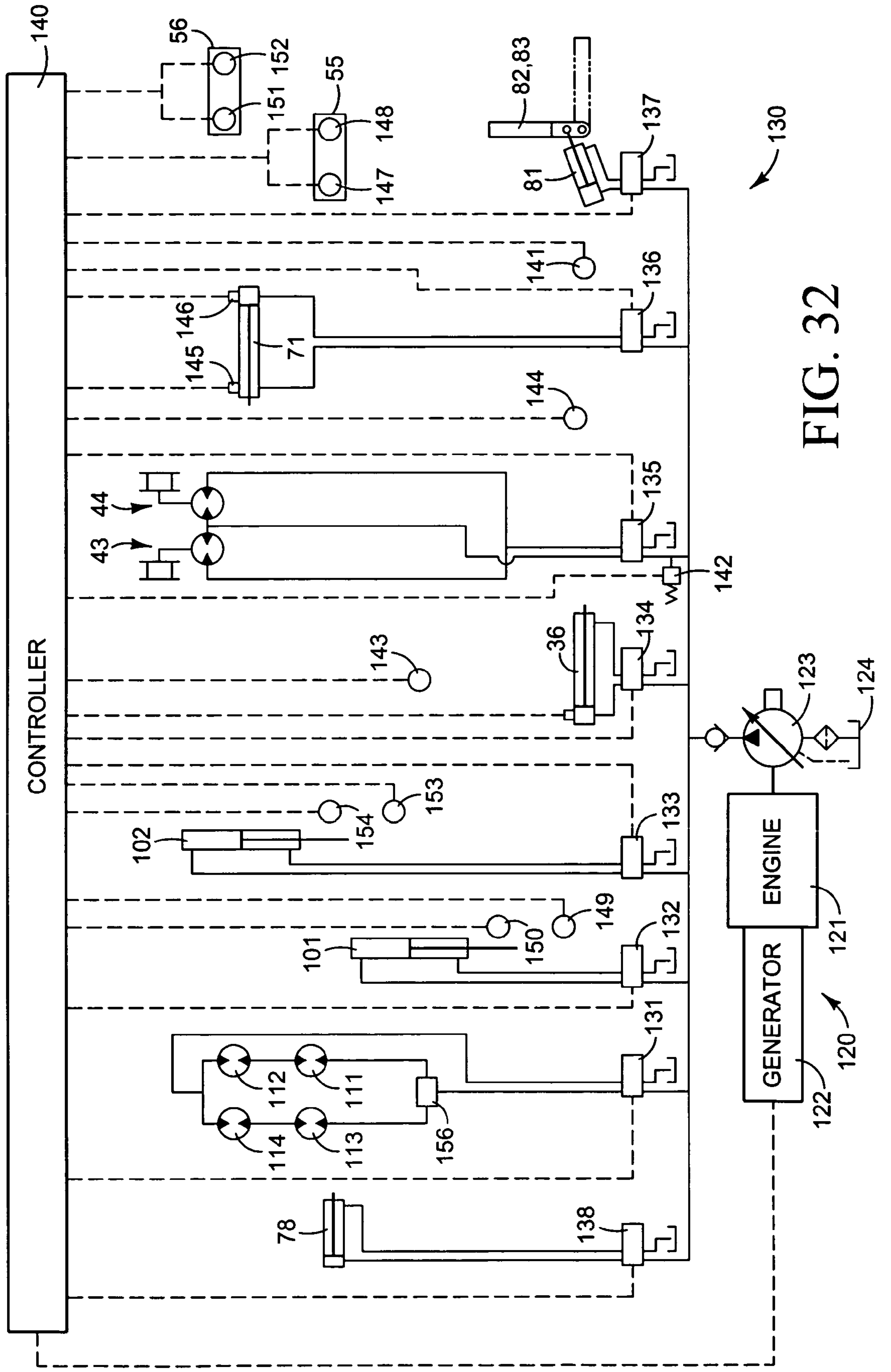
FIG. 32 is a schematic representation depicting the power and control systems for the pipe installation device according to a preferred embodiment of the present invention.

Trench sidewall sensing system 50 senses a location of trench T relative to the position of carriage 11 and includes angular motion sensors 55 and 56 positioned at the upper ends of arms 51 and 52 respectively. Control arms 57 and 58, (shown in FIG. 1), depend from swing arms 51 and 52. Sidewall contact paddles 53 and 54 are connected at the distal ends of control arms 57 and 58 respectively. Sidewall contact paddles 53 and 54 are adapted such that in the event contact is made with either sidewall SW1 or SW2 of trench T, sidewall contact paddle 53 or 54 are angularly displaced, (as shown in FIGS. 2), causing rotation of its respective attached control arm 57 or 58, (as shown in FIGS. 1). The associated angular motion sensor 55 or 56 senses an angular displacement of control arm 57 or 58 providing an output to controller 140, shown in FIG. 32, representative of the degree of angular displacement of the sidewall contact paddle. Control of the steering of carriage 11 as a function of the output of angular motion sensors 55 and 56 is discussed in greater detail below.

FIGS. 4 and 7 show pipe installation device 10 including pipe alignment system 60 positioned on floor F of trench T and attached to carriage 10. Referring to FIGS. 4 and 7, pipe alignment system 60 is shown supported by wheel 61A and 61 B. Pipe alignment system 60 includes pipe restraint system 80 and pipe joining system 70. Pipe joining system 70 and pipe restraint system 80 are shown carried by pipe alignment frame 69.

Figure 3:
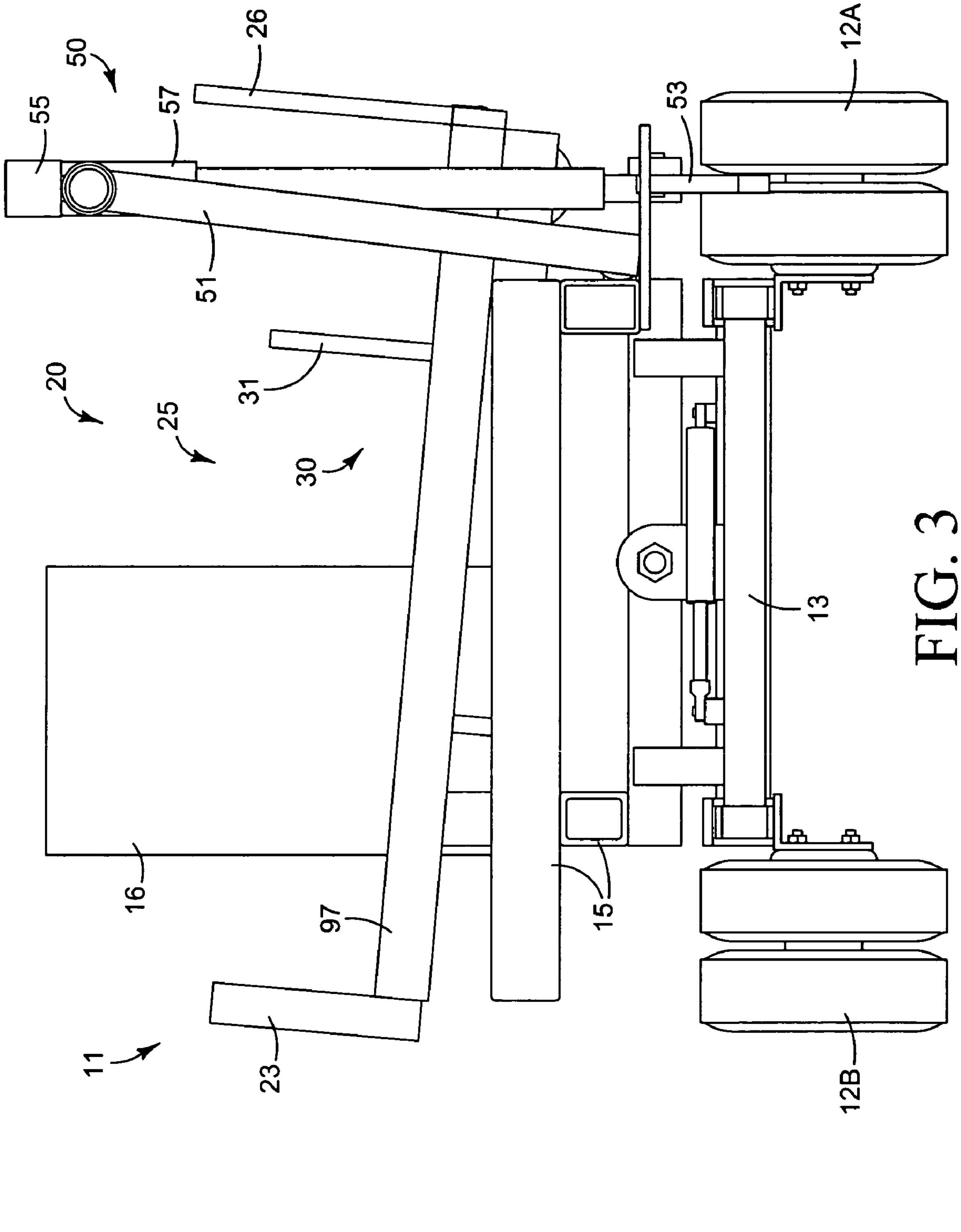
FIG. 3 is a representative rear elevation depicting a carriage for the pipe installation device according to a preferred embodiment of the present invention.

FIG. 3 shows a rear plan elevation of carriage 11 configured for transportation. Carriage 11 includes frame 15 and pipe supply system 20 including pipe rack 25. As seen in FIG. 3, pipe rack 25 includes inclined cross-frame member 97. Power and control systems housing 16 is shown supported by frame 15. Wheels 12A and 12B are mounted to axle 13 which is pivotably attached to frame 15 which assists with articulation of carriage 11 over irregular terrain often encountered at the edge of trench T. Pipe storage rack 25 and power and control systems housing 16 are shown supported by frame 15. Swing arm 51 of sidewall sensing system 50 is shown in an "up" position. Angular motion sensor 55, is shown positioned at an upper end of control arm 57 and sidewall contact paddle 53 is connected at a distal end control arm 57. With the swing arms in the "up" position, carriage 11 may be transported on most roadways without special permitting. FIG. 3 also shows upright 23 and catch arm 26 of pipe storage rack 25. Outer release arm 31 of pipe release mechanism 30 is shown in an upright position.

Figure 5:
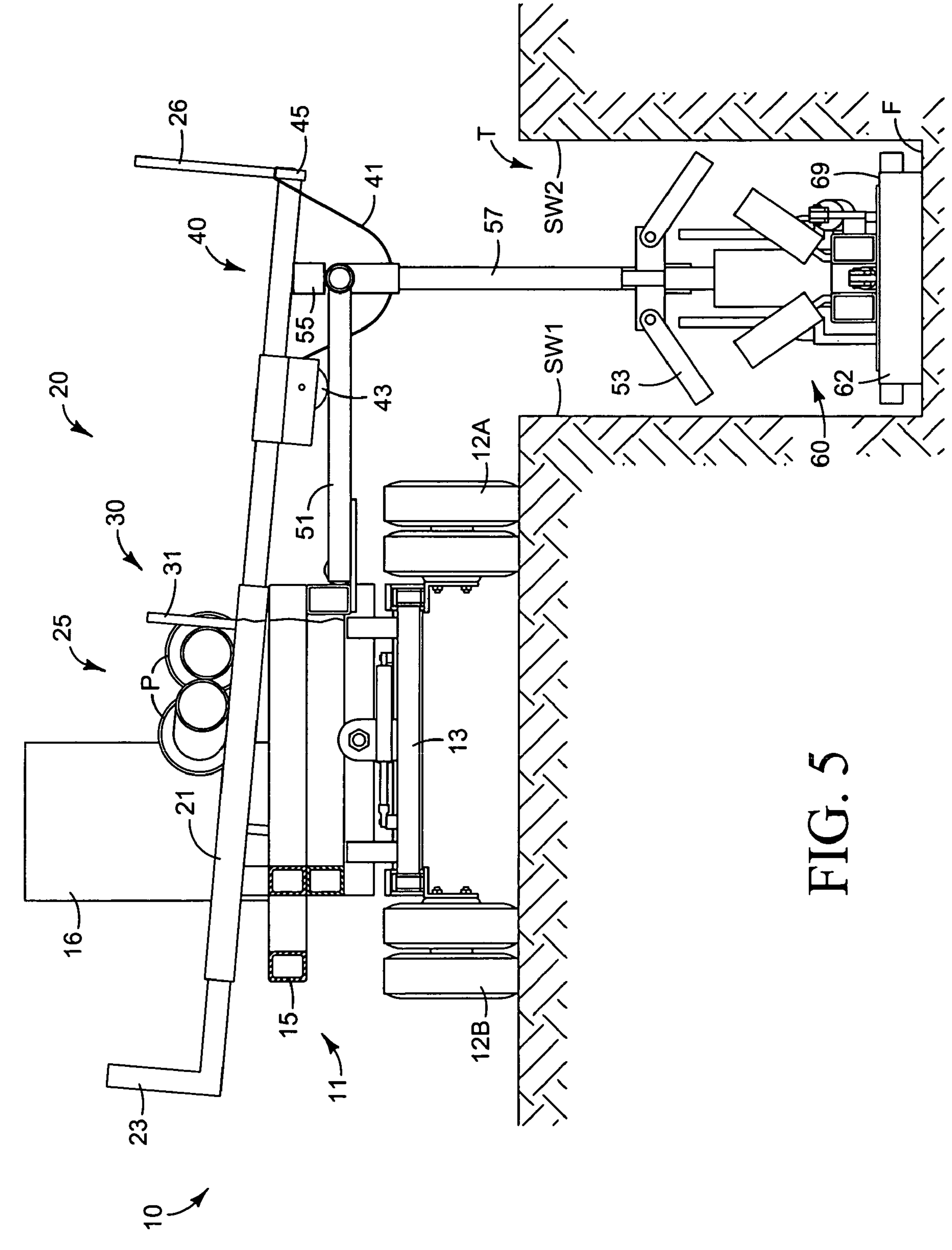
FIGS. 5, 8 and 10 are representative rear elevations depicting a pipe installation device according to a preferred embodiment of the present invention.
Figure 8:
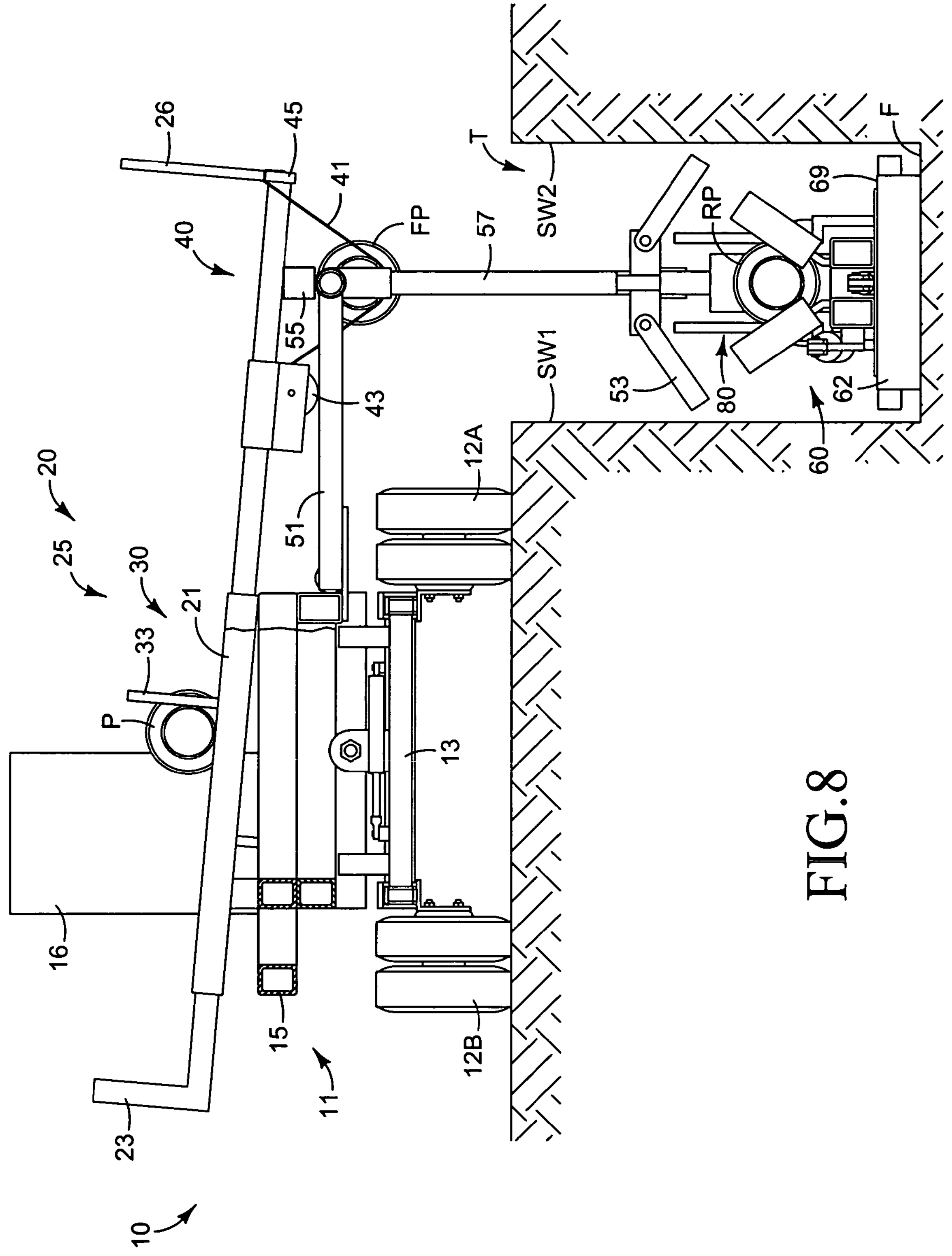
Figure 10:
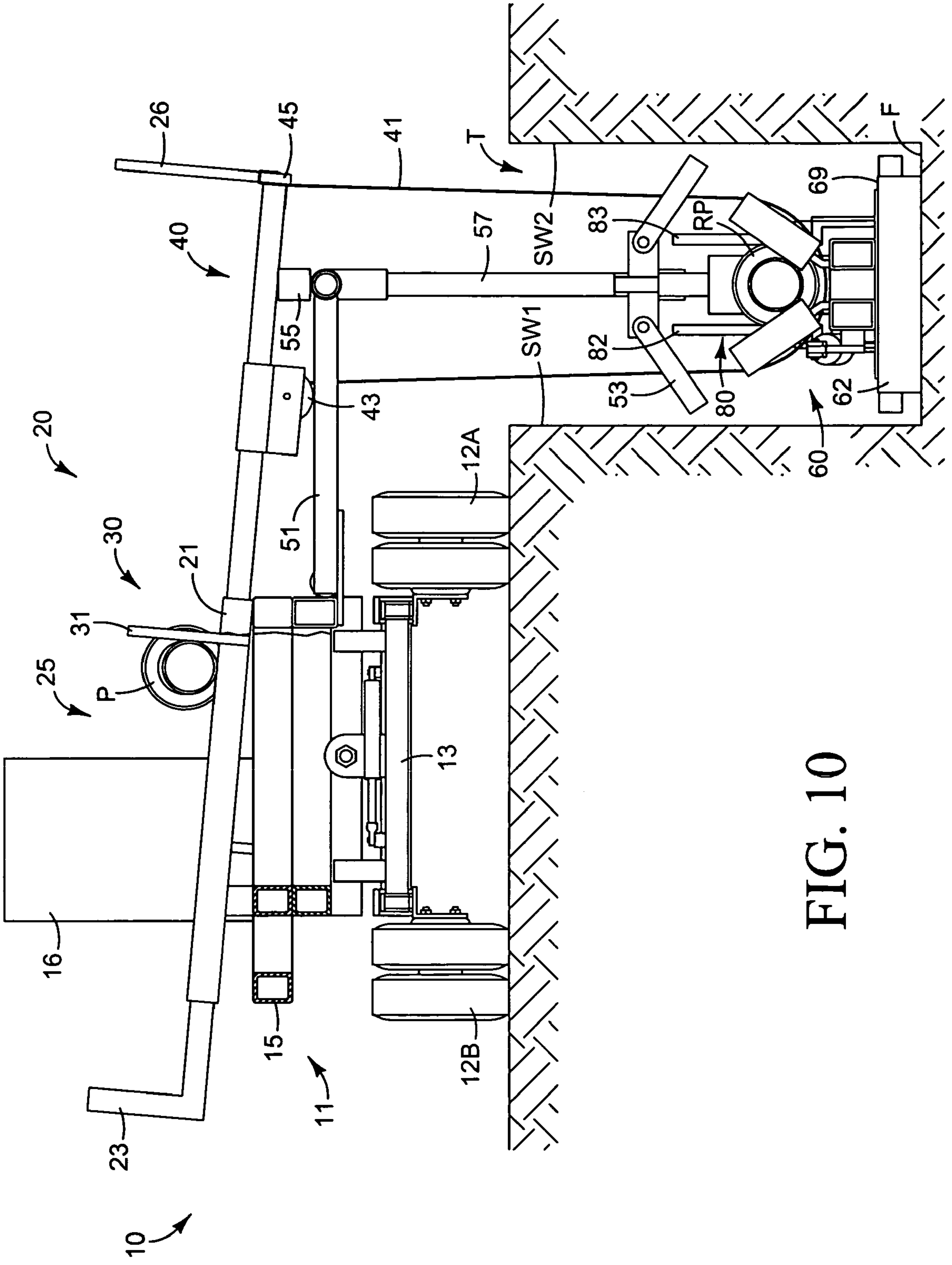

FIGS. 5, 8 and 10 are rear elevations depicting pipe installation device 10 including carriage 11 including frame 15 shown supported by a rear wheels 12A and 12B, shown in the referenced figures connected to axle 13. Pipe installation device 10 also includes pipe supply system 20 and power and control systems housing 16 shown supported by carriage 11. FIG. 5 shows pipe release mechanism 30 including outer release arm 31, while FIGS. 8 and 10 show inner release arm 33, which alternately restrict or selectively release pipe P from rolling down first inclined rail 21. Pipe release mechanism 30 is adapted to selectively release a pipe length P from pipe storage rack 25 and pipe feed system 40 for lowering the pipe length P onto pipe alignment system 60. Pipe alignment system 60 is shown positioned on floor F of trench T and includes frame 69 and skid 62. Rearward pipe length is shown in FIG. 8 positioned on pipe alignment frame 69 restrained by pipe restraint system 80 and forward pipe length FP is shown held in pipe lowering system 40. Pipe feed system 40 is shown including winch 43, strap 41, which may be extended and retracted by winch 43, and arm 45 to which a second end of strap 41 is attached and to which catch arm 26 is connected and from which it extends upwardly. In FIGS. 5, 8 and 10, swing arm 51 of sidewall sensing system 50 is shown in a lowered position between sidewalls SW1 and SW2 of trench T. Angular motion sensor 55, is attached at an upper end of control arm 57 and sidewall contact paddle 53 is connected at a distal end control arm 57. FIGS. 5, 8 and 10 also show pipe storage rack 25 including first inclined rail 21, upright 23 and catch arm 26.

Figure 13:
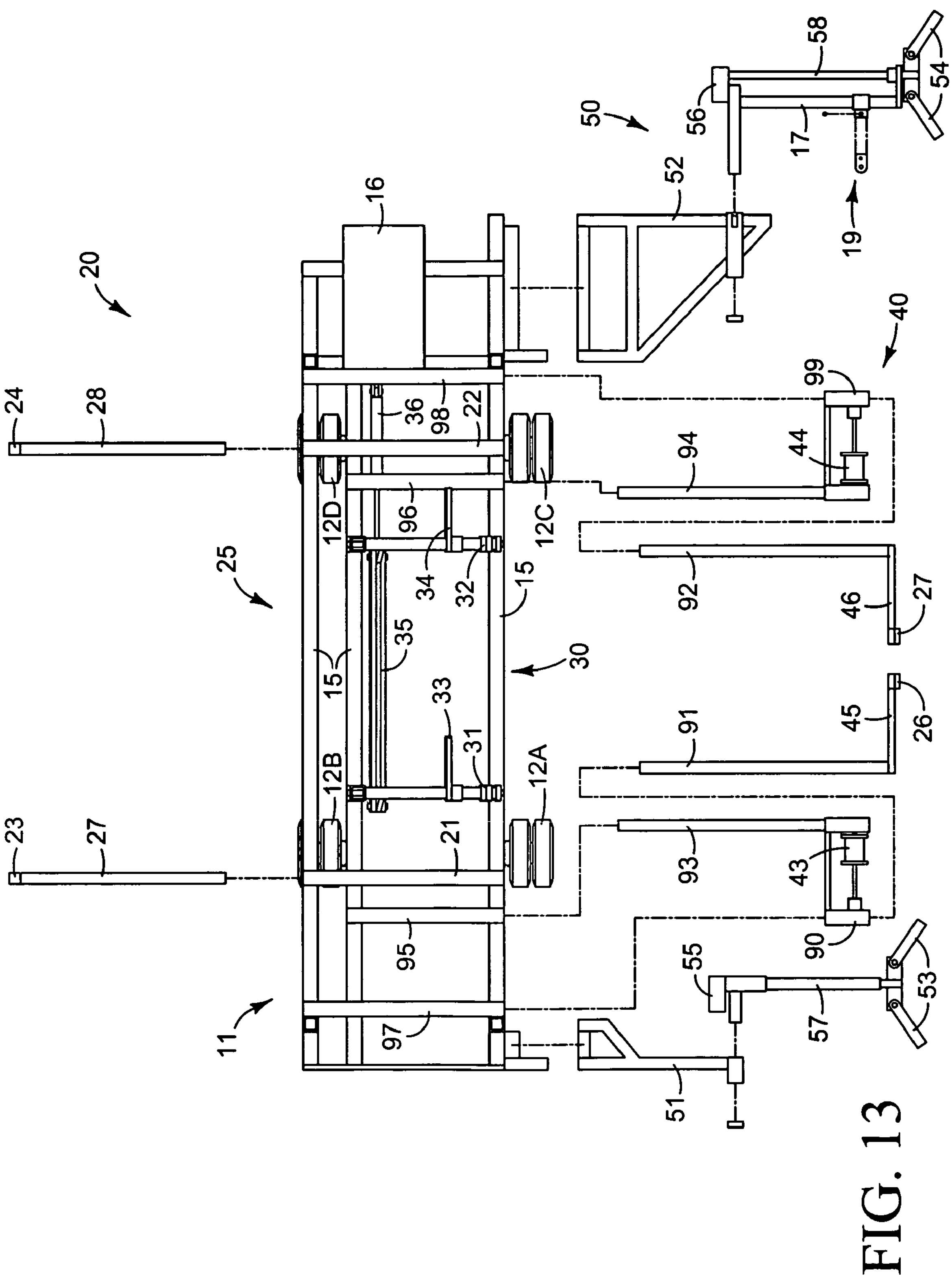
FIG. 13 is a representative top elevation depicting the carriage and various features of the pipe storage rack and feed systems in exploded format for the pipe installation device according to a preferred embodiment of the present invention.
Figure 15:
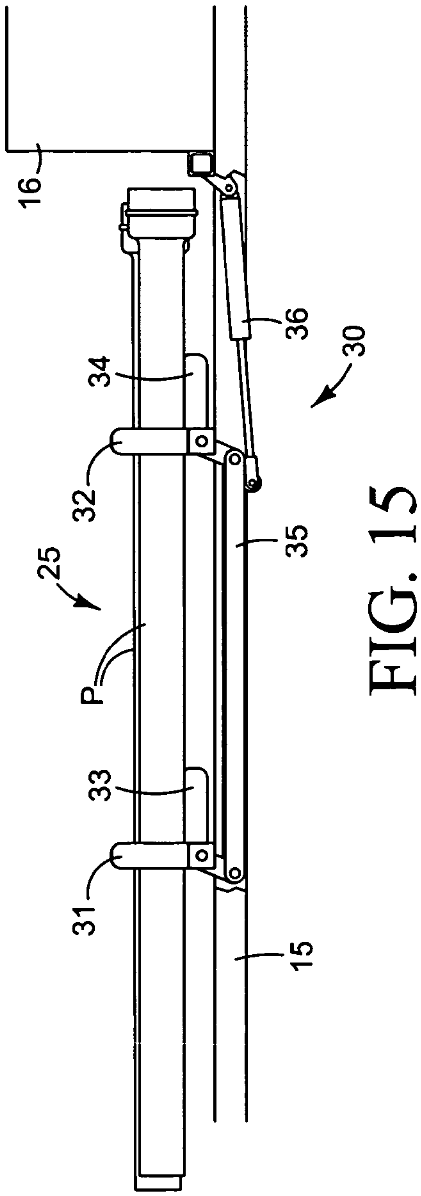
FIGS. 15, 17, 19 and 21 are representative side elevations depicting operation of a pipe release mechanism for the pipe installation device according to a preferred embodiment of the present invention.
Figure 17:
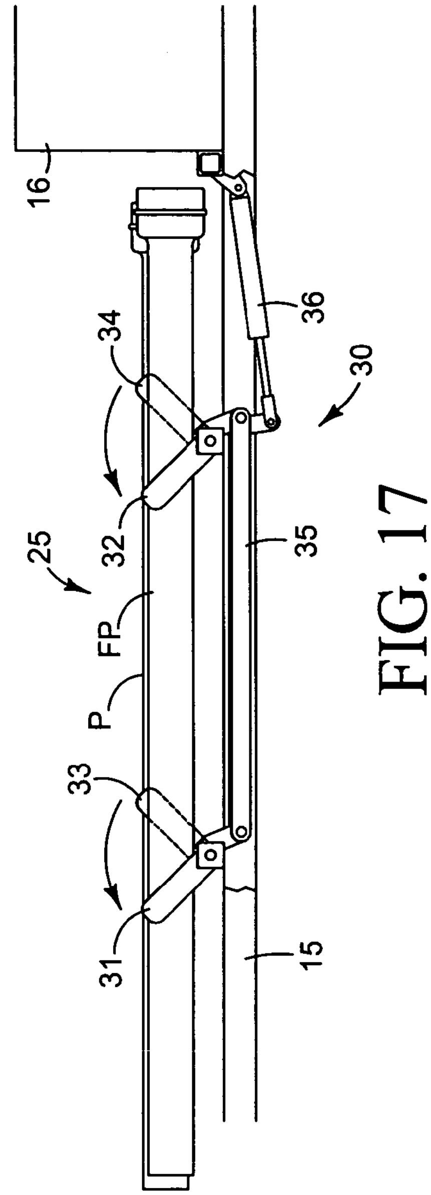
Figure 14:
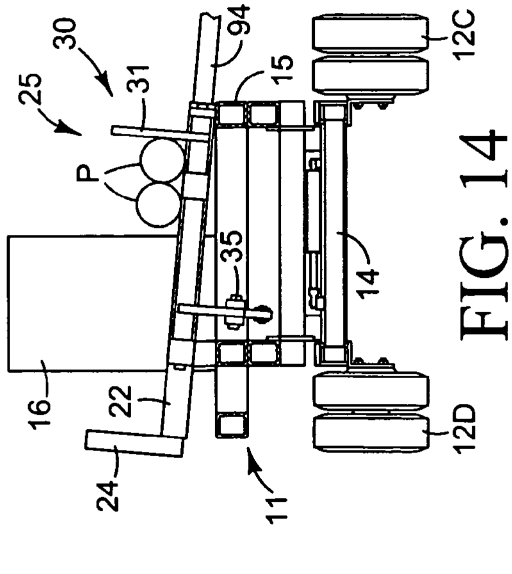
FIGS. 14, 16, 18 and 20 are a representative rear partial cutaway views depicting operation of a pipe release mechanism for the pipe installation device according to a preferred embodiment of the present invention.
Figure 16:
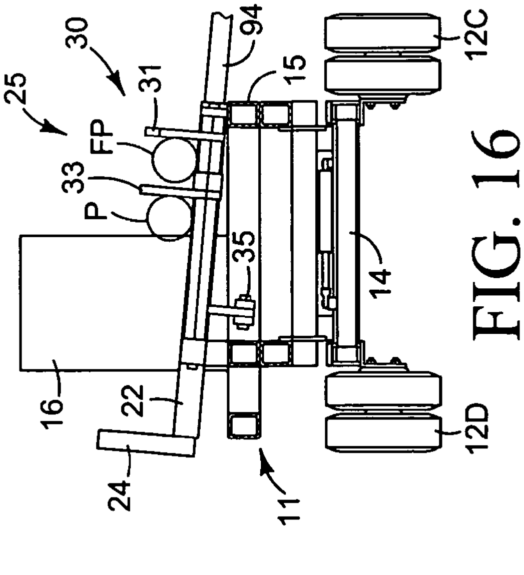

FIG. 13 is a top elevation showing carriage 11 as well as various features of pipe supply system 20 including pipe storage rack 25, pipe release mechanism 30 and feed system 40 in an exploded format. As shown, carriage 11 includes frame 15 supported by wheels 12A through 12D. Pipe storage rack 25, pipe release mechanism 30, pipe feed system 40, power and control systems housing 16 and trench sidewall sensing system 50 are all connected to and supported by frame 15. Pipe lengths P are shown supported by first inclined rail 21 and second inclined rail 22.

Referring to FIG. 13, ramp slide extenders 27 and 28 insert into first inclined rail 21 and second inclined rail 22 respectively and include uprights 23 and 24 and permit the widening of pipe storage rack 25 when in use, while allowing carriage 11 to be reduced in width for transport. Winch support arms 93 and 94 slideably engage inclined cross-frame members 95 and 96 and permit the widening of frame 15 to extend over trench T, (not shown in FIG. 13), in use. Similarly, keeper slide extenders 91 and 92 slideably engage cross-frame members 97 and 98 and permit the widening of frame 15 to extend over trench T, (not shown in FIG. 13), while the device is in use and can be retracted for transport. Winch support arms 93 and 94 include cross-frame member carriers 90 and 99, through which cross-frame members 91 and 92 are inserted, prior to engaging inclined cross-frame members 97 and 98. All of the above adjustments that permit widening and narrowing of carriage 11 may be performed manually or in the alternative they may be automated using for instance servo motors or hydraulics.

FIG. 13 also shows pipe release mechanism 30, for selectively releasing a pipe length P from pipe storage rack 25 and pipe feed system 40. Pipe feed system 40 is shown including winches 43 and 44 connected to winch support arms 93 and 94 and arms 45 and 46 to which a second end of straps 41 and 42 respectively are attached and to which catch arms 26 and 27 are connected and extend. FIGS. 13 also shows trench sidewall sensing system 50 including swing arms 51 and 52 each connected to frame 15 in an articulating manner. Angular motion sensors 55 and 56, are positioned at the distal ends of swing arms 51 and 52 respectively. Tow bar 17 attaches to swing arm 52 and shear pin 19 attaches to tow bar 17. Control arms 57 and 58 depend from swing arms 51 and 52. Sidewall contact paddles 53 and 54 are connected at the distal ends of control arms 57 and 58 respectively. Finally, FIG. 13 shows pipe release mechanism 30 including outer release arms 31 and 32, inner release arms 33 and 34 connected by release linkage 35. Release ram 36 is shown operatively connected to release linkage 35.

FIGS. 14-21 detail the operation of pipe release system 30 that selectively releases a pipe length P from pipe storage rack 25 to pipe feed system 40. More particularly, FIGS. 14,16,18 and 20 are rear elevations of carriage 11 depicting pipe lengths P being held in pipe storage rack 25 or selectively released by operation of pipe release system 30. Carriage 11 includes frame 15 supported by a plurality of wheels, wheels 12C and 12D being shown in the referenced figures attached to axle 14. Pipe storage rack 25 and power and control systems housing 16 shown supported by carriage 15. Upright 24 extends in a vertical upright orientation from second inclined rail 22. Winch support arm 94 is shown extending laterally at an incline from frame 15. FIGS. 15, 17, 19 and 21 are side elevations showing pipe release mechanism 30, pipe storage rack 25 and power and control systems housing 16 supported by carriage 15.

Figure 18:
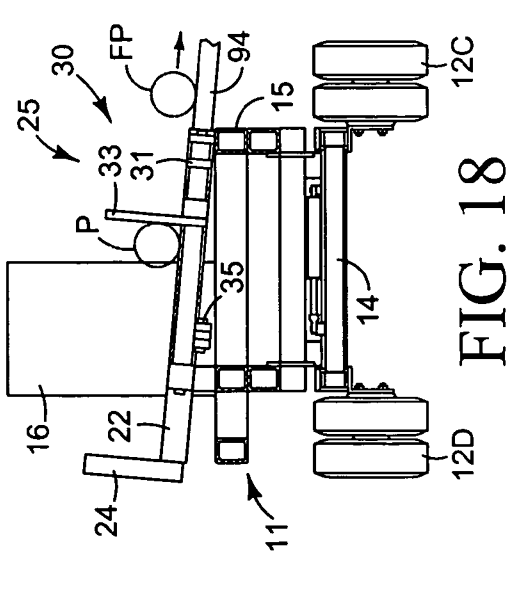
Figure 19:
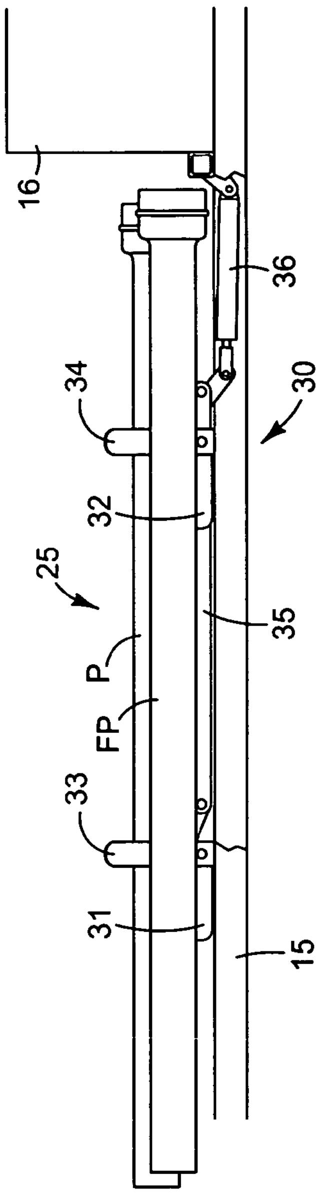
Figure 20:
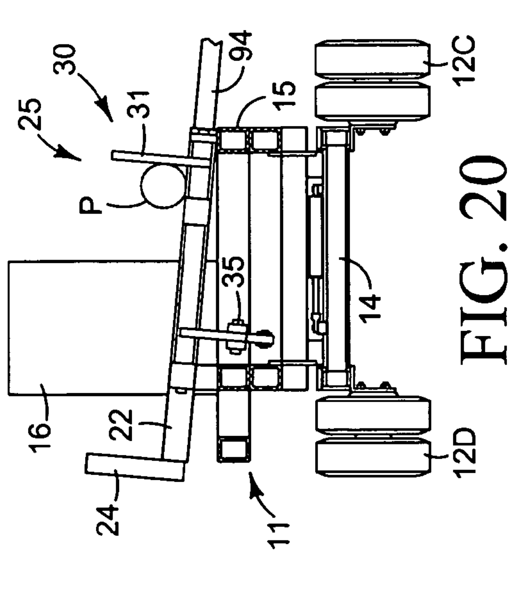
Figure 21:
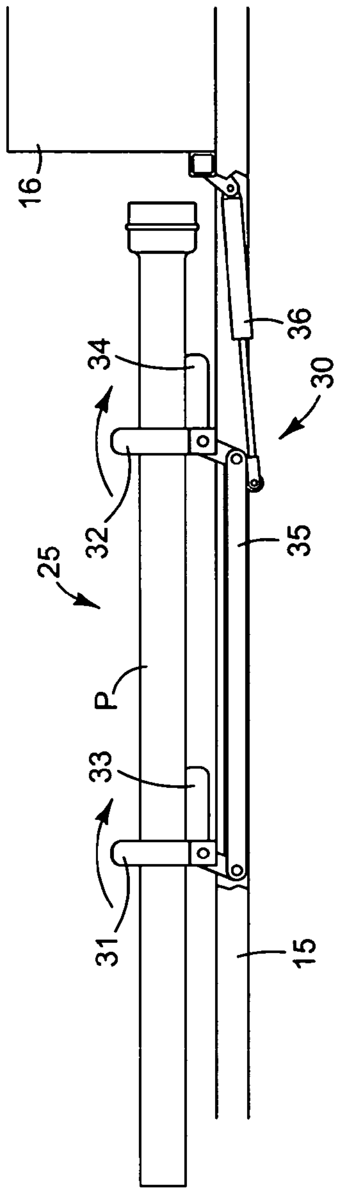

Pipe release mechanism 30 includes outer release arms 31 and 32, inner release arms 33 and 34 connected by release linkage 35. In FIGS. 15, 17, 19 and 21, release ram 36 is shown operatively connected to release linkage 35. At FIGS. 14 and 15, outer release arms 31 and 32 hold forward pipe lengths P on frame 15. At FIGS. 16 and 17, release ram 36 selectively operates to isolate forward pipe length FP between outer release arms 31 and 32 and inner release arms 33 and 34. As release ram 36 continues its extension, release linkage 35 operates outer release arms 31 and 32 and inner release arms 33 and 34 to simultaneously release forward pipe length FP retaining pipe length P in pipe storage rack 25, as shown in FIGS. 18 and 19. (See also FIGS. 7 and 8). FIGS. 20 and 21 show pipe length P being retained in pipe storage rack 25 until the next subsequent cycle of pipe release system 30.

Figure 6:
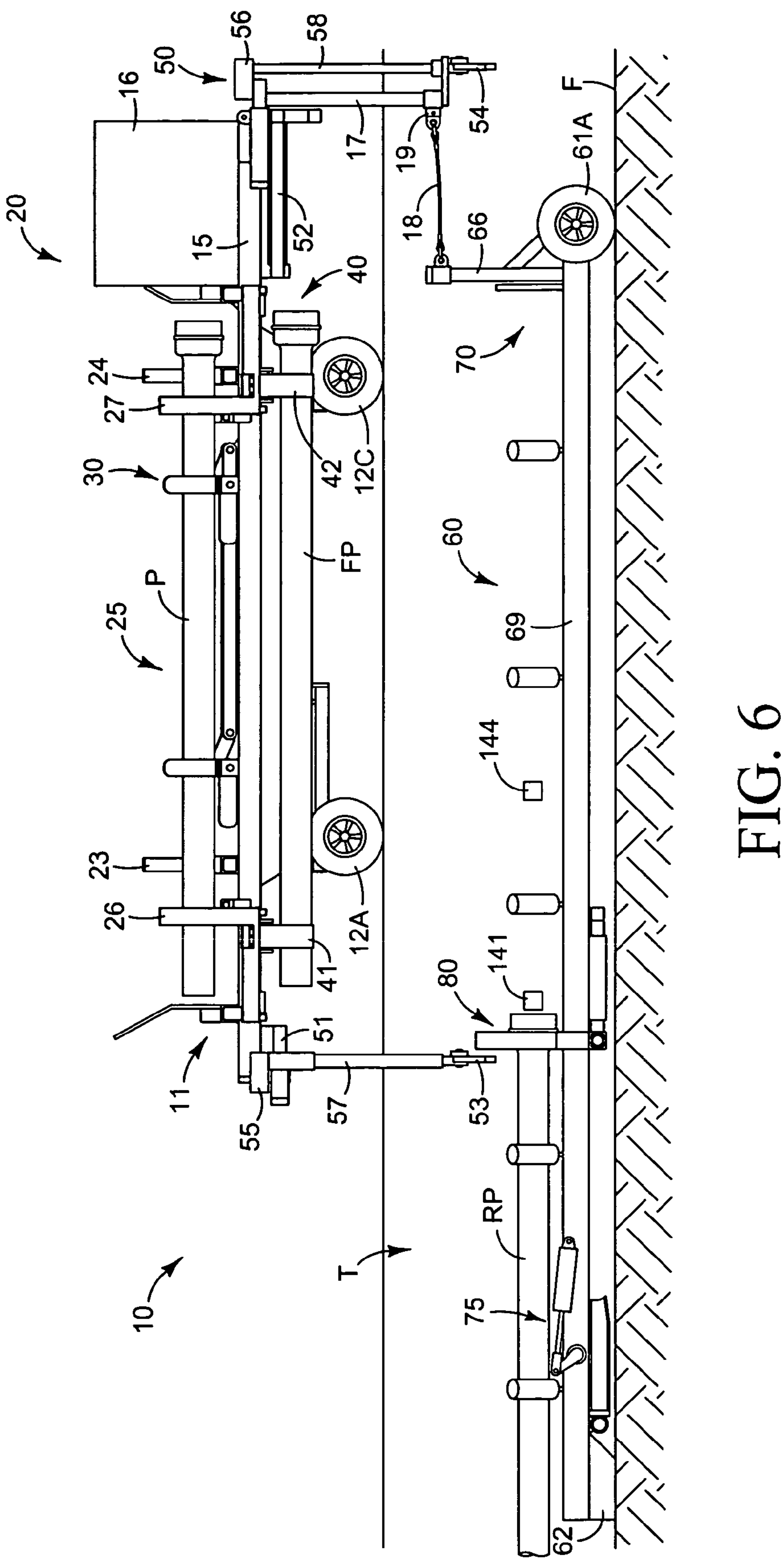

FIGS. 6-12 show a sequence of operation of pipe feed system 40. As rearward pipe length RP passes sensor 141, pipe feed mechanism 30 is triggered and forward pipe length FP is released from pipe rack 25. As seen in FIGS. 6 and 8, once forward pipe length FP rolls down inclined pipe ramps 21 and 22, it is caught in straps 41 and 42. Straps 41 and 42 are connected at a first end to winches 43 and 44 respectively and at their respective second ends to arms 45 and 46. Sensor 142, a limit switch shown in FIG. 32, senses when winches 43 and 44 have retracted straps 41 and 42. Sensor 142 provides an output to controller 140, shown in FIG. 32, which triggers operation of release ram 36 to release forward pipe length FP from pipe supply 20 as discussed more fully herein below. Sensor 143, a limit switch shown in FIG. 32, is tripped when forward pipe length FP is released from pipe supply rack 20 into pipe feed system 40. When sensor 143, senses the release of forward pipe length FP, controller 140, shown in FIG. 32, initiates operation of winches 43 and 44 to begin lowering forward pipe length FP onto pipe alignment frame 69 as shown in FIGS. 9-12. At this time, controller 140, shown in FIG. 32, also initiates extension of release ram 36, shown in FIG. 21, to prepare for the release of the next pipe length P in the following pipe release cycle. Sensor 144, seen in FIGS. 6, 9, 11 and 12, senses when forward pipe length FP has been lowered onto pipe alignment frame 69 and provides an output to the controller 140, shown in FIG. 32, which then continues operation of winches 43 and 44 for a preset time period to allow straps 41 and 42 to lower to a point where they are clear of forward pipe length FP as seen in FIGS. 9-12.

Figure 22:
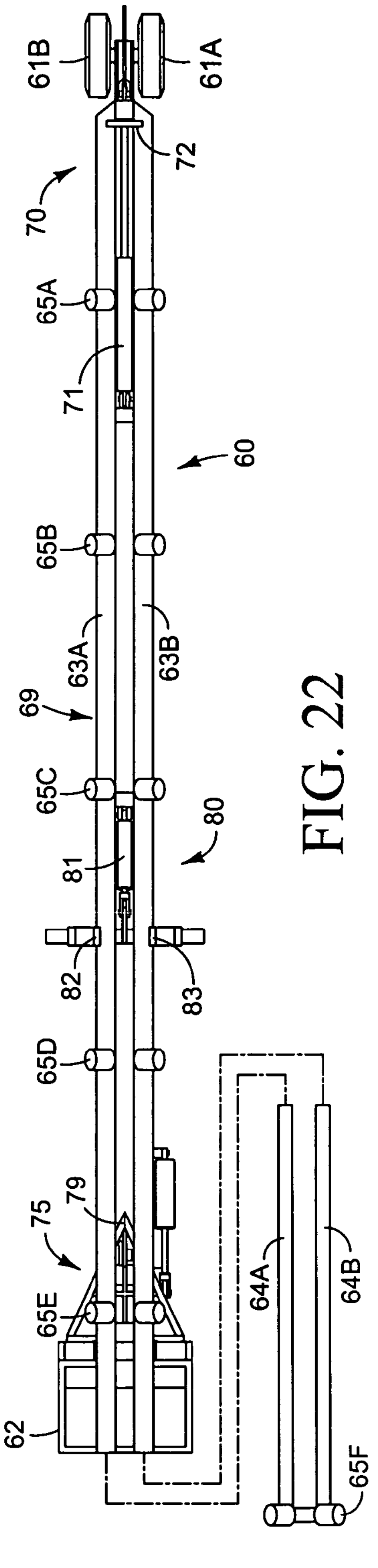
FIG. 22 is a representative top elevation depicting a pipe alignment system according to a preferred embodiment of the present invention.
Figure 23:
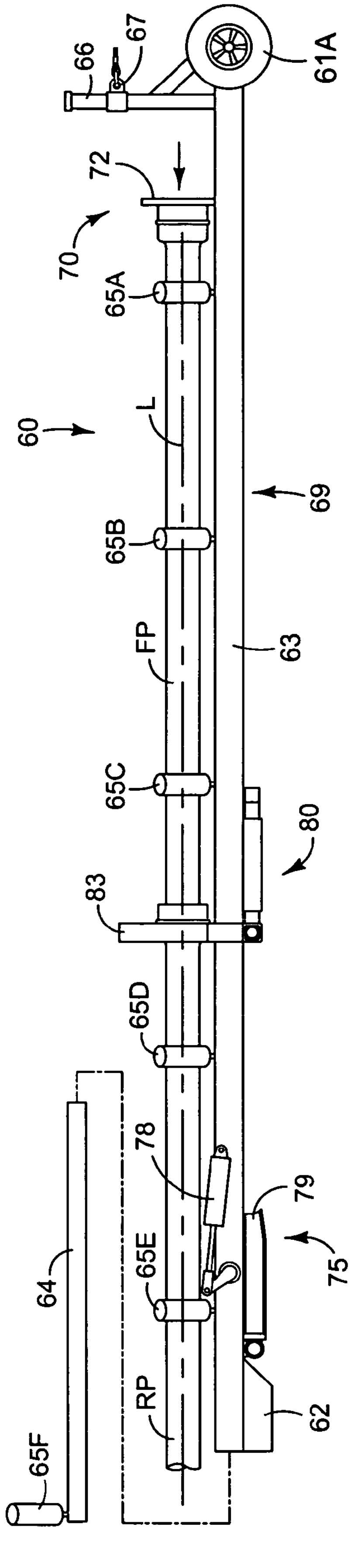
FIGS. 23 and 24 are representative side elevations depicting a pipe alignment system, pipe restraint system and bell divot systems for the pipe installation device according to a preferred embodiment of the present invention.
Figure 24:
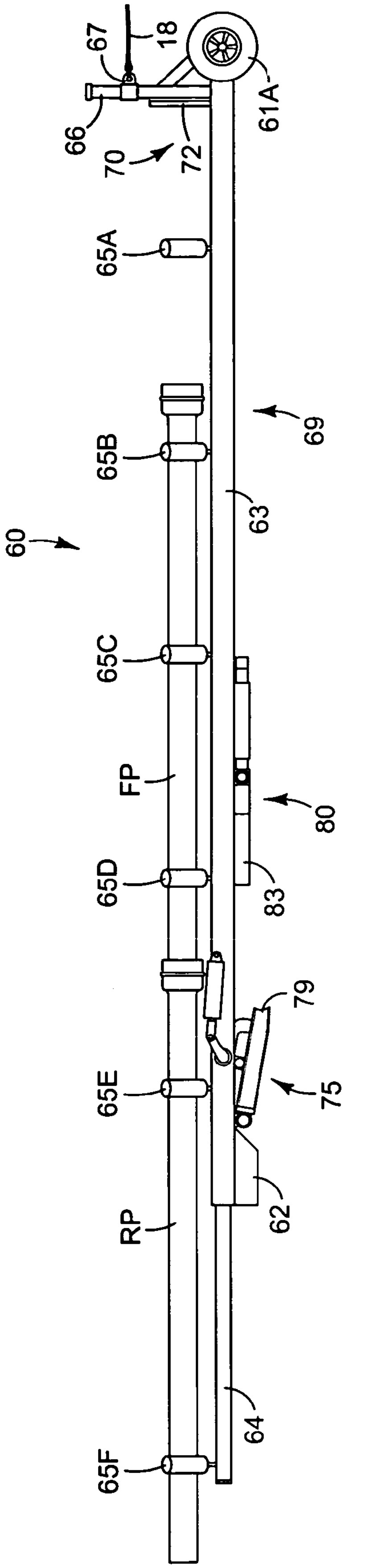

FIGS. 22-24 provide a more detailed depiction of pipe alignment system 60. Pipe alignment frame 69 is shown supported by skid 62 and wheels 61A and 61 B, shown in FIG. 22. Pipe alignment frame 69 includes pipe alignment frame 69 including alignment frame forward section 63 and alignment frame tail section 64. Upright 66 is connected to and extends vertically from pipe alignment frame 69 and cable 18, shown in FIGS. 1 and 24, is connected to lug 67. A plurality of V-rollers 65A-65F are positioned along the length of pipe alignment frame 69. Once forward pipe is positioned on pipe alignment frame 69 as seen in FIG. 23, forward pipe length FP and rearward pipe length RP are aligned along longitudinal axis L by the fact of their placement on V-rollers 65A-65F. It should be noted that V-rollers 65A-65F are adjustable to accept pipe having a variety of diameters. Alignment frame forward section 63 includes a pair of substantially parallel and spaced apart frame elements 63A and 63B. Similarly, alignment frame tail section 64 includes a pair of substantially parallel and spaced apart frame elements 64A and 64B. Alignment frame forward section 63 and alignment frame tail section 64 are joined as shown in FIGS. 22 and 23 and consequently may be separated for transport. Pipe alignment frame 69 is supported by wheels 61A and 61B, (shown in FIG. 21), and skid 62. Upright 66 with lug 67 provide a point of attachment to connect pipe alignment system 60 to carriage 11, as shown in FIG. 1. FIG. 24 shows forward pipe length FP positioned on pipe alignment frame 69 and rearward pipe length RP is positioned in pipe alignment frame 69 extending along alignment frame forward section 63 onto alignment frame tail section 64.

As shown FIGS. 22-24, pipe joining system 70 is attached to pipe alignment frame 69 of pipe alignment system 60. Pipe joining system 70 includes joining ram 71, which is connected at a first end between frame elements 63A and 63B of alignment frame forward section 63. A second end of joining ram 71 is connected to push plate 72, which travels with the extension and retraction of joining ram 71.

FIGS. 22-24 also show pipe restraint system 80 attached to pipe alignment frame 69. As shown in FIG. 22, pipe restraint system 80 includes retainer ram 81 and retainer forks 82 and 83. FIGS. 23 and 24 show retainer ram 81 and retainer fork arm 83 connected to pipe alignment frame 69.

FIGS. 22-24 also show bell divot system 75 connected to pipe alignment frame 69. As seen in FIGS. 22-24, bell divot system 75 includes divot ram 78 and divot cutter 79. As shown in FIG. 23, pipe alignment system 60 is adapted to align forward pipe length FP along a longitudinal axis L with rearward pipe length RP positioned on pipe alignment frame 69.

Figure 27:
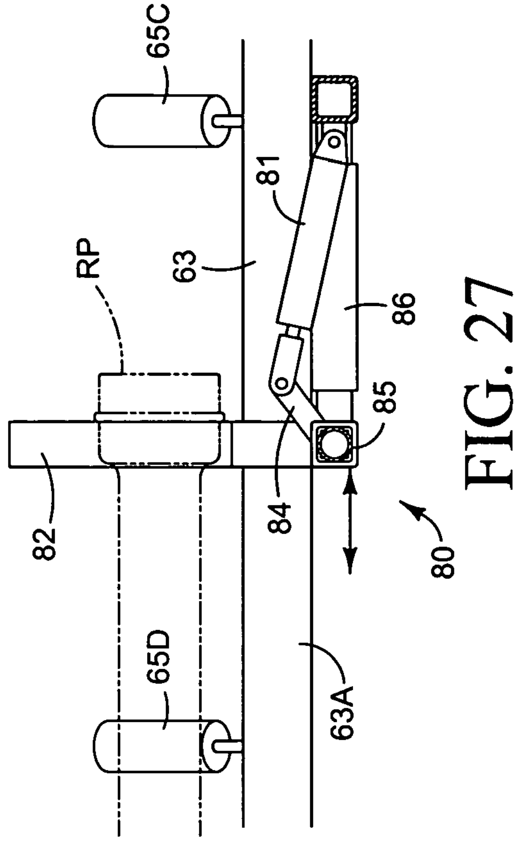
FIGS. 26 and 27 are representative side cross-sectional views depicting a pipe restraint system for the pipe installation device according to a preferred embodiment of the present invention.
Figure 25:
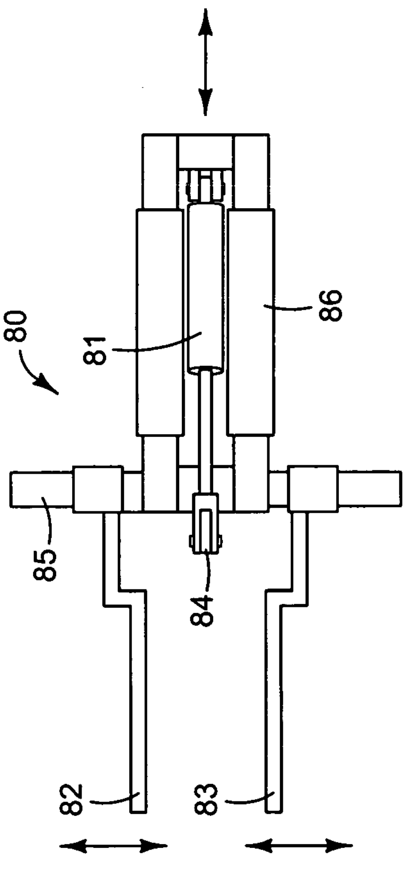
FIG. 25 is representative bottom elevation depicting a pipe restraint system for the pipe installation device according to a preferred embodiment of the present invention.
Figure 26:
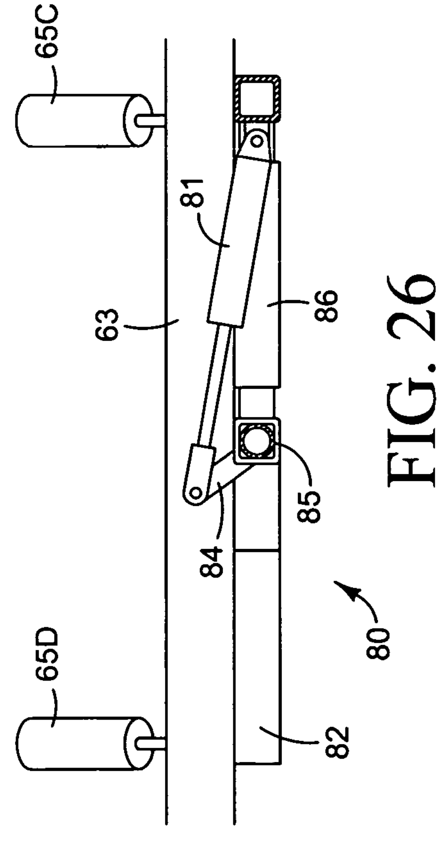

Referring to FIGS. 25-27, pipe restraint system 80 is shown including retainer ram 81 connected to retainer forks 82 and 83 by link arm 84. In FIGS. 26 and 27, pipe restraint system 80 is shown connected to alignment frame forward section 63 between V-rollers 65C and 65D. Retainer fork forks 82 and 83, seen in FIG. 25, and retainer fork 83, seen in FIGS. 26 and 27, are mounted on shaft 85 and are fixably slideable along shaft 85 to accommodate various pipe diameters having different bell sizes. Slide linkage 86 permits adjustment of a location of shaft 85 with respect to pipe alignment frame 69 also to accommodate various pipe diameters having different bell sizes. Retainer forks 82 and 83 pivot on shaft 85 between a "down" position as shown in FIGS. 25 and 26 wherein movement of a pipe length along pipe alignment frame 69 is unrestricted and an "up" position, shown in FIG. 27 in response to the extension and retraction of retainer ram 81, wherein movement of rearward pipe length RP is restricted.

Figure 12:
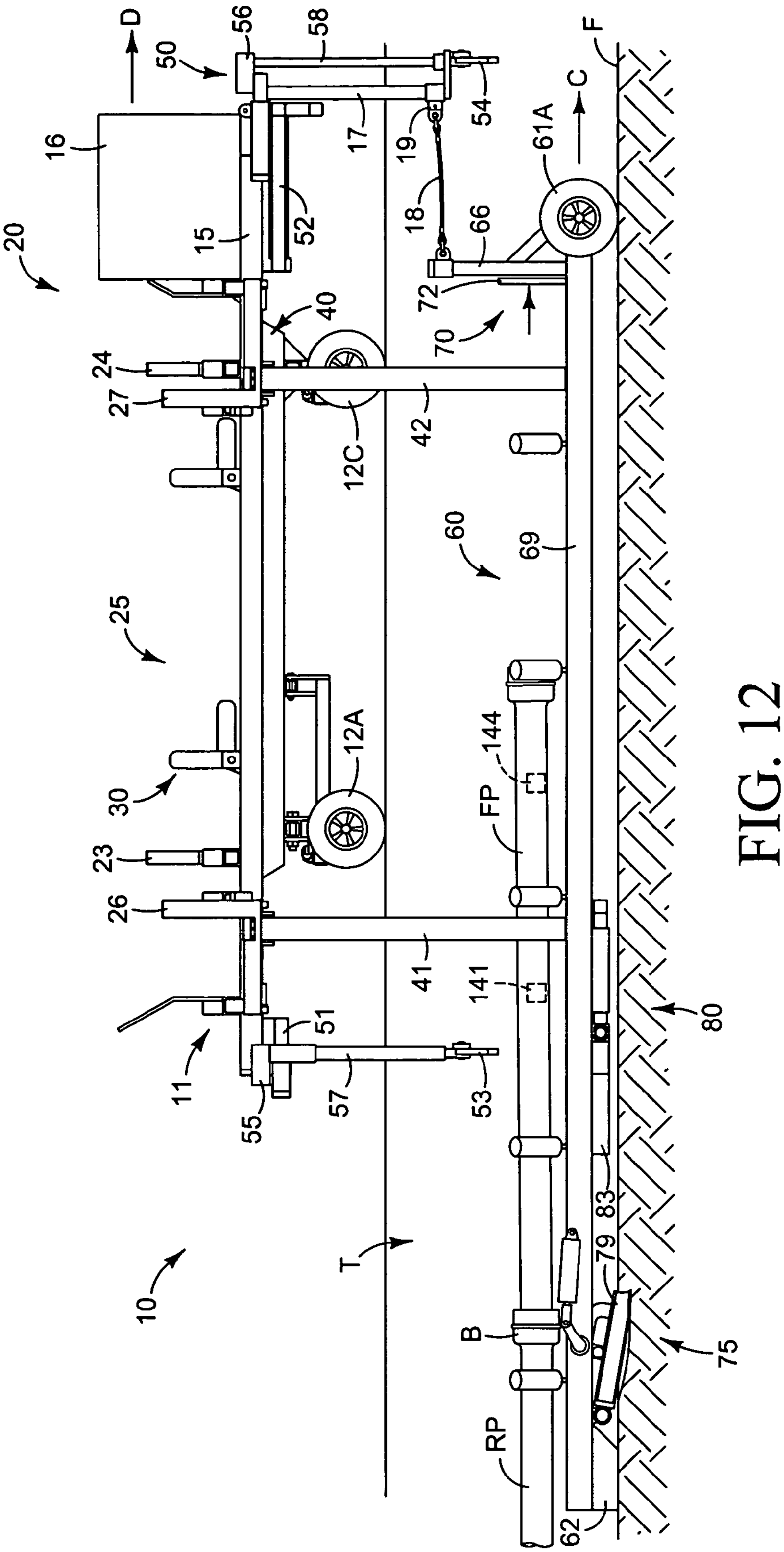
Figure 28:
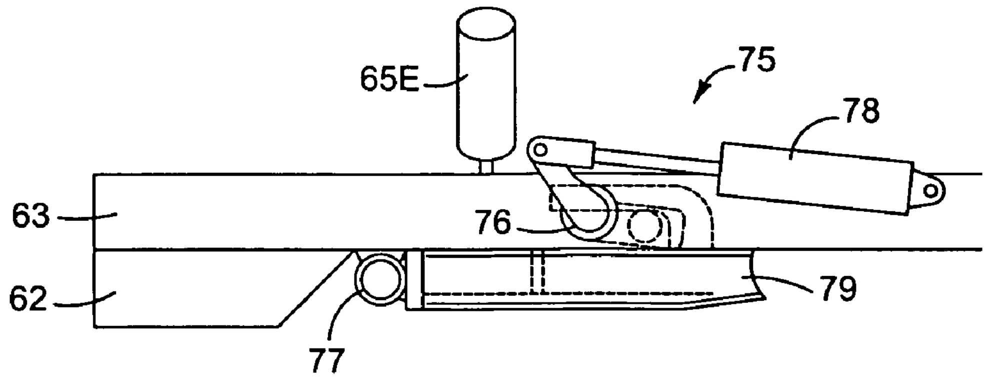
FIGS. 28 and 29 are representative side elevations depicting a divoting mechanism of the pipe installation device according to a preferred embodiment of the present invention.
Figure 29:
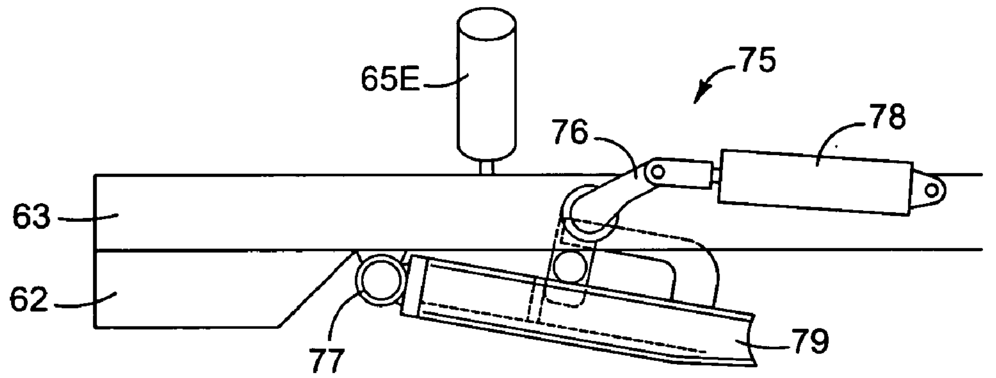
Figure 30:
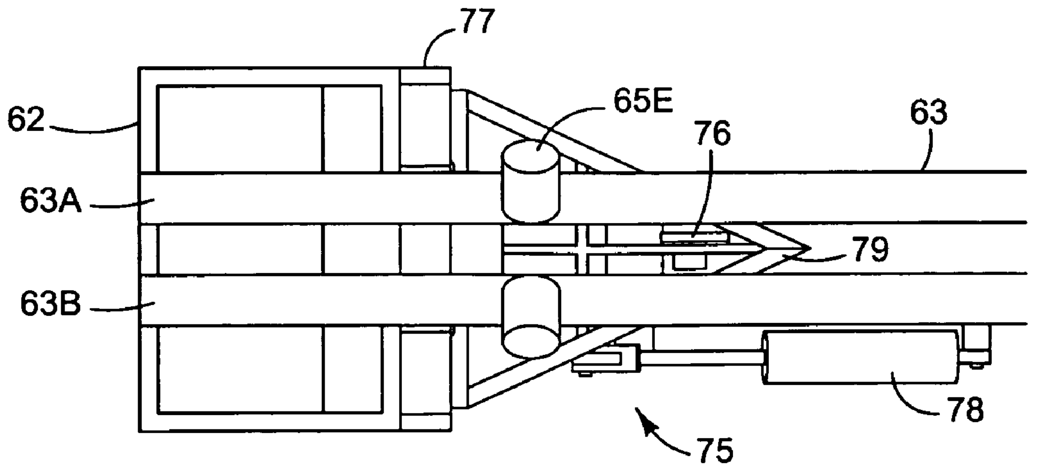
FIG. 30 is a representative top elevation depicting a divoting mechanism of the pipe installation device according to a preferred embodiment of the present invention.

Referring to FIGS. 28-30, bell divot system 75 is shown connected to alignment frame forward section 63 in front of skid 62. V-roller 65E is also shown attached to alignment frame forward section 63. Bell divot system 75 includes divot ram 78 attached at a first end pipe to alignment frame forward section 63 and at a second end to linkage 76, which connects to a divot cutter 79. Divot cutter 79 pivots on shaft 77 with extension and retraction of divot ram 78 and linkage 76. Bell divot system 75 is adapted to selectively excavate a depression in the floor of the trench at a point at which a bell section of a pipe length is to ultimately lie on the floor of the trench. Divot cutter 79 is selectively positioned between a "travel" position, as seen in FIG. 28, and a "dig" position as seen in FIG. 29. Divot cutter 79 is usually positioned in a "travel" position, as seen in FIG. 28 wherein divot cutter 79 does not make contact with the floor of the trench. Referring to FIG. 12, as pipe alignment system 60 moves in a forward direction indicated by the reference figure "D", bell section B of rearward pipe length RP, passes over bell divot system 75, divot ram 78 retracts and divot cutter 79 is moved to the "dig" position, shown in FIG. 29, where it remains for approximately 45 cm, (approximately 18 inches), of travel to excavate a divot that measures approximately 15 cm, (approximately 6 inches), wide by 45 cm, (approximately 18 inches), long into which bell B will lie when it ultimately comes to rest on floor F.

Figure 9:
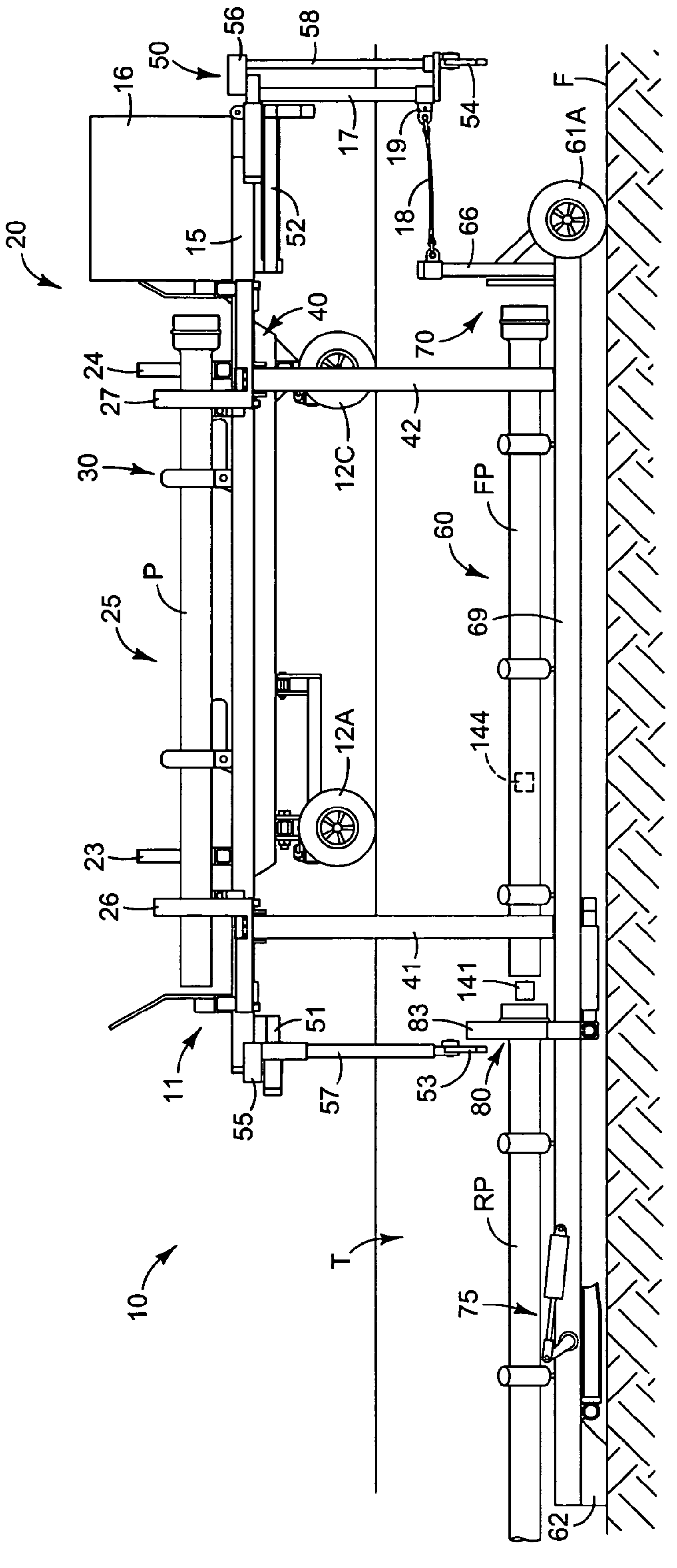
Figure 11:
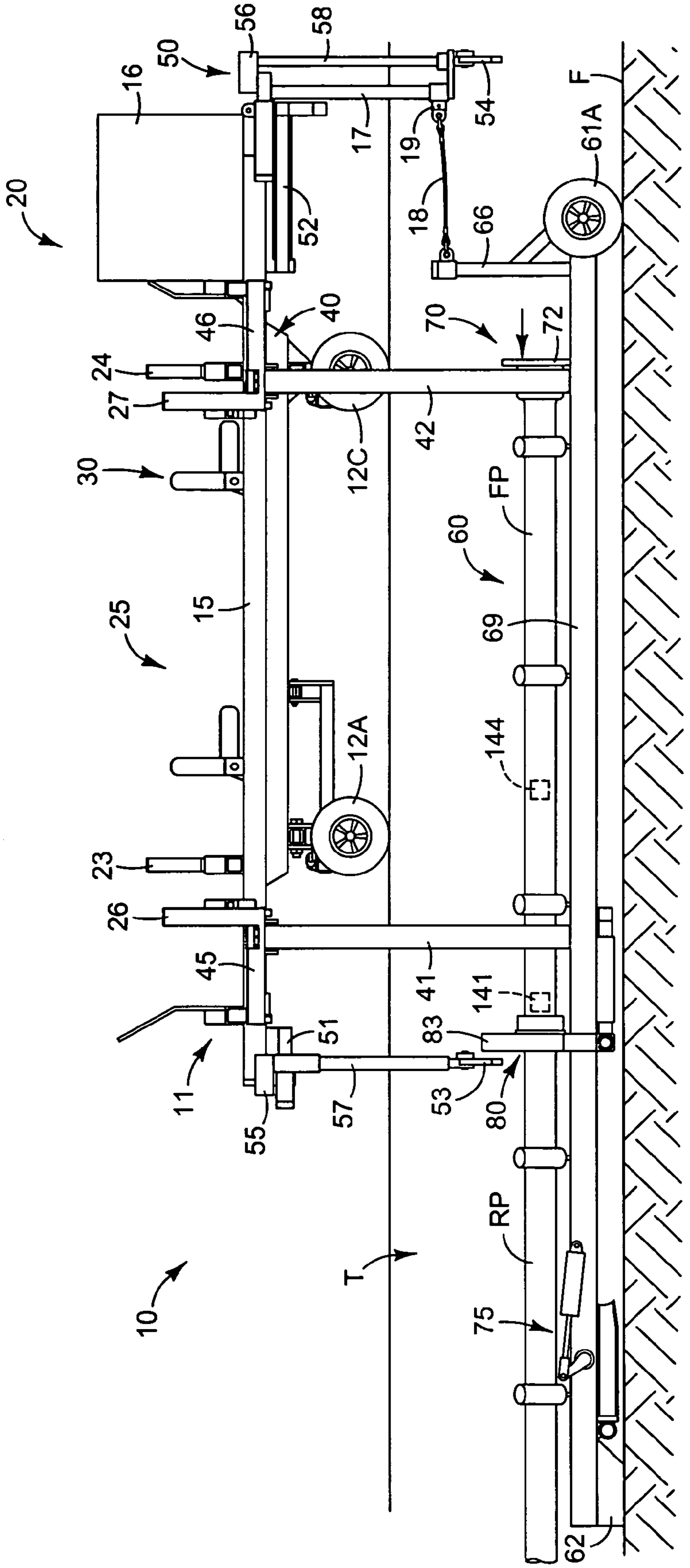

Referring to FIGS. 9-12, operation of pipe restraint system 80 and pipe joining system 70 will be described in detail. Once rearward pipe length RP has passed pipe passage sensor 141, as shown in FIG. 9, forward travel of pipe installation device 10 is suspended. When sensor 143, senses the release of forward pipe length FP, controller 140, shown in FIG. 32, retainer ram 81 of pipe restraint system 80 retracts lifting retainer forks 82 and 83, as shown in FIG. 109 shown in FIGS. 26 and 27, pivoting retainer forks 82 and 83 on shaft 85 between a "down" position, shown in FIG. 26, to an "up" position, FIG. 27. Once forward pipe is lowered onto pipe alignment frame 69 as seen in FIG. 9, forward pipe length FP and rearward pipe length RP are aligned longitudinally. When forward pipe length FP is lowered onto pipe alignment frame 69, sensor 144 is tripped, as shown in FIG. 9, and operation of winches 43 and 44 continue for a preset time period to allow straps 41 and 42 to be lowered well below forward pipe length FR as seen in FIGS. 9-11. Also when sensor 144, is tripped operation of pipe joining system 70 is initiated and, as seen in FIG. 23, joining ram 71 retracts forcing push plate 72 against forward pipe length FP, as shown in FIG. 11, joining forward pipe length FP to the restrained rearward pipe length RP. Joining ram 71 includes a limit switch 145, shown in FIG. 32, that may be adjusted to control the extension of joining ram 71. In this manner, insertion depth of a spigot end of forward pipe length FP into the bell end of the restrained rearward pipe length RP may be accurately set and controlled for various pipe sizes.

Once joining ram 71 reaches the outer limit of its preset extension, limit switch 145, shown in FIG. 32, is tripped and extension of joining ram 71 is initiated until limit switch 146, shown in FIG. 32, is tripped providing an output that joining ram 71 has reached full retraction and joining ram 71 is de-energized. The output from limit switch 145, shown in FIG. 32, that joining ram 71 has reached full extension prompts controller 140, shown in FIG. 32, to initiate extension of retainer ram 81, shown in FIGS. 26 and 27, pivoting retainer forks 82 and 83, retainer fork 83 shown in FIG. 12, on shaft 85 from the "up" position, FIG. 27 to the "down" position, shown in FIG. 26. The output from limit switch 145, shown in FIG. 32, that joining ram 71 has reached full extension also prompts controller 140, shown in FIG. 32, to signal the resumption of travel of pipe installation device 10 in direction D along a course of pipeline construction C, as shown in FIG. 12. Output from limit switch 145, shown in FIG. 32, that joining ram 71 has reached full extension also prompts controller 140, shown in FIG. 32, to initiate retraction of divot ram 78 moving divot cutter 79 from a "travel" position, seen in FIG. 28, to a "dig" position as seen in FIG. 29. An output from sensor 144, indicating that forward pipe length FP has moved beyond sensor 144, as shown in FIG. 12, prompts controller 140, shown in FIG. 32, to initiate extension of divot ram 78 moving divot cutter 79 from the "dig" position as seen in FIG. 29, to the "travel" position, seen in FIG. 28.

Figure 31:
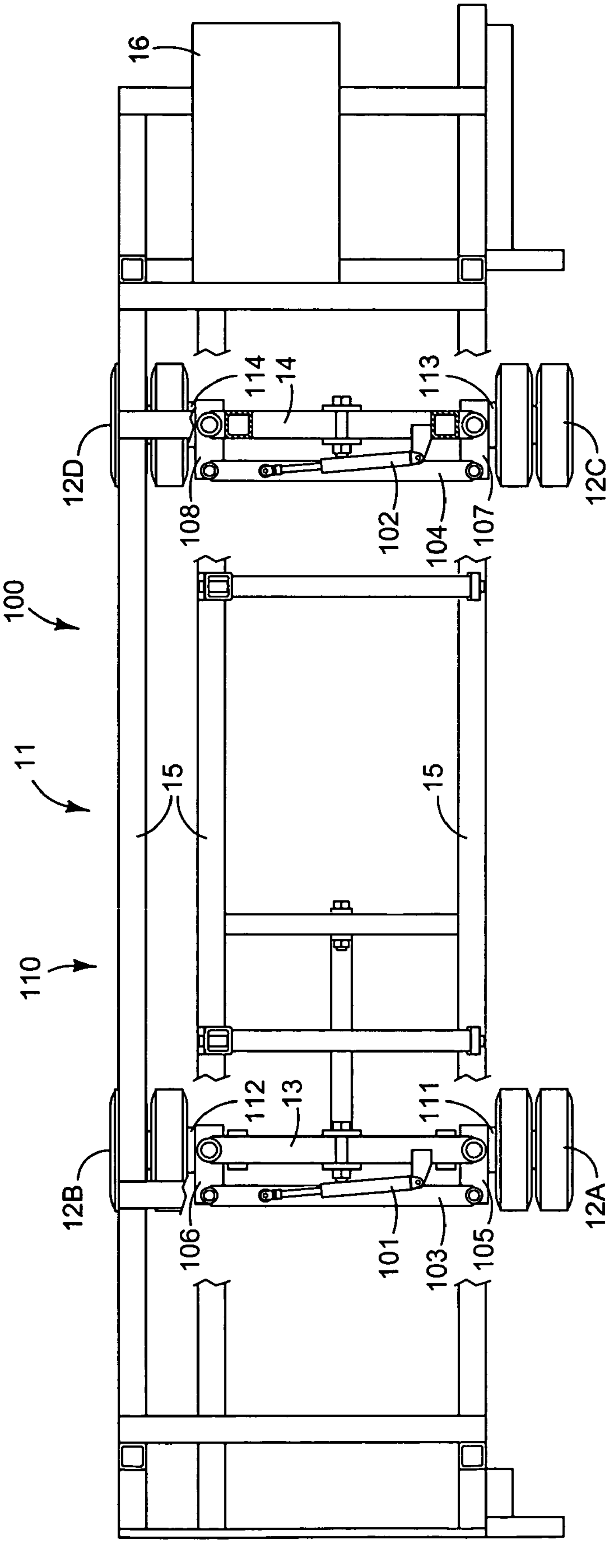
FIG. 31 is a representative top cutaway view depicting various features of the drive and steering systems for the pipe installation device according to a preferred embodiment of the present invention.

Referring to FIG. 31, carriage 11 is shown including frame 15 which supports power and control systems housing 16. Frame 15 is shown in a top cutaway format to illustrate certain features of steering system 100 and drive system 110. In the preferred embodiment of the invention, carriage 11 is steered by steering system 100. Steering system 100 includes head plate 105 pivotably attached at a first end of axle 13 and head plate 106 attached at a second end of axle 13. Link arm 103 is also pivotably attached between head plates 105 and 106. Hydraulic steering ram 101 is connected at a first end to axle 13 and at a second end to link arm 103.

Similarly, head plate 107 pivotably is attached at a first end of axle 14 and head plate 108 is attached at a second end of axle 14. Link arm 104 is also pivotably attached between head plates 107 and 108. Hydraulic steering ram 102 is connected at a first end to axle 14 and at a second end to link arm 104. Steering rams 101 and 102 extend and retract in response to an output from a controller 140, shown in FIG. 32, as more fully discussed herein below.

FIG. 31 also shows carriage 11 driven by four hydraulic planetary speed reducing motors 111-114, one connected at head plate 105-108 respectively, to which wheels 12A-12 D are mounted respectively. Hydraulic power is applied at each of the hydraulic planetary speed reducing motors 111-114 as discussed herein below.

FIG. 32 is a representative schematic diagram showing features of power system 120 and control system 130. In the preferred embodiment, power system 120 includes engine 121, generator 122 and hydraulic pump 123 connected to hydraulic reservoir 124. Control system 130 includes solenoid operated control valves 131-138, sensors 141-147 and controller 140. Control system 130 may also include a remote control device, not shown, that permits an operator to control functions of the pipe installation device including "on-off", travel, stop, energize feed system, energize pipe joining system and "kill." As shown, control system 130 includes the following solenoid operated control:

a) Control valve 131, a 3-position 4 way solenoid operated control valve, controls forward travel by regulating flow to hydraulic planetary speed reducing motors 111-114. As seen in FIG. 32, forward travel circuit 148 includes flow divider 156 that assures that power applied to front hydraulic planetary speed reducing motors 113 and 114 and rear hydraulic planetary speed reducing motors 111 and 112 is substantially equal.

b) Control valve 132, a 3-position 4 way solenoid operated control valve, controls flow to front steering ram 101.

c) Control valve 133, a 3-position 4 way solenoid operated control valve, controls flow to rear steering ram 102.

d) Control valve 134, a 2-position solenoid operated control valve, controls operation of release ram 36.

e) Control valve 135, a 3-position 4 way solenoid operated control valve, controls flow to winches 43 and 44.

f) Control valve 136, a 2-position solenoid operated control valve, controls operation of joining ram 71.

g) Control valve 137, a 3-position solenoid operated control valve, controls operation of bell retainer ram 81.

h) Control valve 138, a 2-position solenoid operated control valve, controls operation of divot ram 78.

Control system 130 also includes sensors 141-152 as follows:

a) Sensor 141, a pipe passage sensor 141, an optical sensing device including a laser optical emitter, a reflector and an optical sensor that provides input to control system 140 indicating that a pipe length has advanced beyond pipe passage sensor 141 on pipe alignment frame 69, as shown in FIG. 9.

b) Sensor 142, a limit switch that is tripped when winches 43 and 44 have fully retracted first and second straps 41 and 42 of pipe feed system 40, as seen in FIGS. 4 and 5.

c) Sensor 143, a limit switch, is tripped when a length of pipe is released from pipe supply rack 20 into pipe feed system 40, as seen in FIGS. 6-8.

d) Sensor 144, an optical sensing device including a laser optical emitter, a reflector and an optical sensor that senses when a pipe length has been lowered onto pipe alignment frame 69 by pipe feed system 40, as seen in FIGS. 9 and 10.

e) Sensor 145, a limit switch that is tripped when joining ram 71 is at a fully extended position, indicating that a forward pipe length has been joined with the rearward pipe length, as seen in FIG. 11.

f) Sensor 146, a limit switch that is tripped when joining ram 71 is at a fully retracted position, as seen in FIG. 12.

g) Sensors 147 and 148, limit switches located in angular motion sensor 55 and are tripped by the angular displacement of sidewall contact paddle sidewall contact paddle 53, shown in FIG. 1.

h) Sensors 149 and 150, limit switches associated with axle 13 which are tripped when wheel 12A or 12B are angulated to the right or left, as seen in FIG. 31.

i) Sensors 151 and 152, limit switches located in angular motion sensor 56 which are tripped by the angular displacement of sidewall contact paddle 54, 54, as shown in FIGS. 2.

j) Sensors 153 and 154, limit switches associated with axle 14 which are tripped when wheel 12C or 12D are angulated to the right or left, as seen in FIG. 31.

Figure 33B:
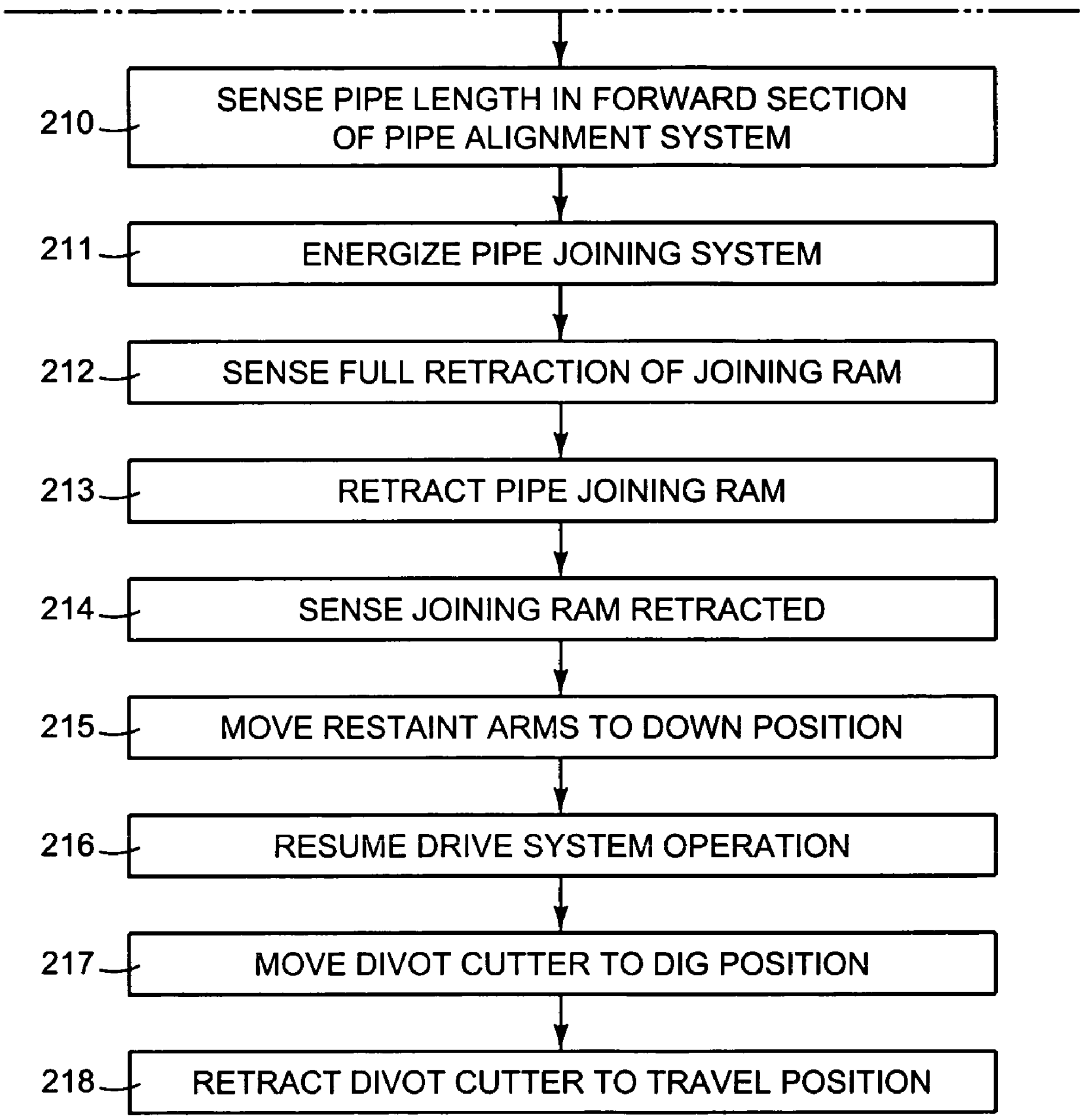

Referring to FIGS. 33A and 33B, a schematic flow diagram depicts a flow or sequence of operation of pipe installation device 10. At step 200, INITIATE OPERATION OF PIPE INSTALLATION DEVICE, operation of pipe installation device 10 is initiated. At step 201, IS PIPE IN ALIGNMENT SYSTEM FORWARD SECTION, controller 140 queries to determine that pipe passage sensor 141 does not sense a reflected signal indicating a pipe length is currently positioned upstream of pipe passage sensor 141, as shown in FIG. 12. Referring to FIG. 33, at step 202, OPERATE DRIVE SYSTEM, control valves 131 and 132 are energized causing rotation of hydraulic planetary speed reducing motors 111-114, shown in FIG. 32, initiating forward motion of pipe installation device 10. In the event that pipe passage sensor 141 senses a reflected signal indicating that rearward pipe length RP has passed pipe passage sensor 141, as shown in FIG. 9, referring to FIG. 33, at step 2034, SUSPEND DRIVE SYSTEM OPERATION, control valves 131 and 132, shown in FIG. 32, are de-energized and forward motion of pipe installation device 10 is suspended. At step 204, MOVE RESTRAINT ARMS TO UP POSITION, control valve 137, shown in FIG. 32, is energized and bell retainer ram 81 retracts raising retainer forks 82 and 83, as shown in FIG. 27 and rearward pipe length RP is restrained against rearward movement. Referring to FIG. 33, at step 205, RETRACT PIPE LAYDOWN STRAPS, control valve 134, shown in FIG. 32, is energized and first and second straps 41 and 42 are retracted as seen in FIG. 5. Referring to FIG. 33, at step 206, STOP WINCHES, sensor 142, sense that first and second straps 41 and 42 are retracted as, shown in FIG. 5, and control valve 134, shown in FIG. 32, is de-energized.

Referring to FIG. 33, at step 207, INITIATE OPERATION OF PIPE RELEASE SYSTEM, control valve 135, shown in FIG. 32, is energized, and release ram 36 retracts moving outer release arms 31 and 32 from a generally vertical orientation to a horizontal orientation and inner release arms 33 and 34 from a generally horizontal orientation to a vertical orientation, as shown in FIGS. 16-19 releasing forward pipe length FP, which rolls down inclined ramps 21 and 22 and is caught by first and second straps 41 and 42, as seen in FIGS. 7 and 8. Referring to FIG. 33, at step 208, SENSE PIPE LENGTH RELEASED, sensor 143, shown in FIG. 32, is tripped as forward pipe length FP rolls down inclined pipe ramp 21. Referring to FIG. 33, at step 209, INITIATE PIPE LOWERING, shown in FIG. 32, control valve 134, shown in FIG. 32, is energized and first and second straps 41 and 42 are extended and forward pipe length FP is lowered onto pipe alignment system 60, as seen in FIG. 9. Referring to FIG. 33, at step 210, SENSE PIPE LENGTH IN FORWARD SECTION OF PIPE ALIGNMENT SYSTEM, sensor 144, shown in FIG. 32, senses that forward pipe length FP has been lowered onto pipe alignment frame 69 of pipe alignment system 60, as seen in FIG. 9.

Referring to FIG. 33, at step 211, ENERGIZE PIPE JOINING SYSTEM, control valve 136, shown in FIG. 32, is energized extending joining ram 71, as seen in FIG. 11, joining forward pile length FP to rearward pipe length RP. Referring to FIG. 33, at step 212, SENSE FULL RETRACTION OF JOINING RAM, sensor 145, shown in FIG. 32, is tripped when joining ram 71 is at a fully extended position, as seen in FIG. 11, indicating that a forward pipe length FP has been joined with the rearward pipe length. Referring to FIG. 33, at step 213, RETRACT PIPE JOINING RAM, control valve 136, shown in FIG. 32, is energized for opposite travel retracting joining ram 71, as seen in FIG. 12. Referring to FIG. 33, at step 214, SENSE JOINING RAM RETRACTED sensor 146, shown in FIG. 32, is tripped when joining ram 71 is at a fully retracted position, as seen in FIG. 12. Referring to FIG. 33, at step 215, MOVE RESTRAINT ARMS TO DOWN POSITION, the second circuit of control valve 137, shown in FIG. 32, is energized and bell retainer ram 81 is extended moving bell retainer arms 82 and 83 to the down position as seen in FIGS. 25 and 26.

Referring to FIG. 33, at step 216, RESUME DRIVE SYSTEM OPERATION, control valves 131 and 132 are re-energized causing rotation of hydraulic planetary speed reducing motors 111-114, shown in FIG. 32, resuming forward motion of pipe installation device 10. Referring to FIG. 33, at step 217, MOVE DIVOT CUTTER TO DIG POSITION, after a pre-set period of time, control valve 138, shown in FIG. 32, is energized and divot ram 78 retracts moving divot cutter 79 to the dig position for a pre selected period of time as shown in FIG. 12. Referring to FIG. 33, at step 218, RETRACT DIVOT CUTTER TO TRAVEL POSITION, after a pre-set period of time, control valve 138, shown in FIG. 32, is energized and divot ram 78 extends moving divot cutter 79 to the travel position as shown in FIG. 28. Forward travel continues until pipe passage sensor 141 senses a reflected signal indicating that rearward pipe length RP has passed pipe passage sensor 141, as shown in FIG. 9, at which point the sequence returns to step 203, SUSPEND DRIVE SYSTEM OPERATION.

While this invention has been described with reference to the detailed embodiments, it s not intended that this description be construed in a limiting sense. Various modifications to the described embodiments, as well as additional embodiments of the invention, will be apparent to persons skilled in the art upon reference to this description. It is therefore contemplated that the appended claims will cover any such modifications or embodiments as fall within the true scope of the invention.

What is claimed is:

1. A pipe installation device for installing sequential pipe lengths along a course of pipeline construction, the device comprising:

a carriage movable along the course of pipeline construction;

a pipe supply system supported by the carriage;

a pipe alignment system attached to the carriage, the pipe alignment system including a pipe alignment frame positioned to receive a forward pipe length from the pipe supply system, the pipe alignment system adapted to align the forward pipe length with a rearward pipe length positioned on the pipe alignment frame;

the pipe alignment system including a pipe restraint system connected to the pipe alignment frame, the pipe restraint system adapted to selectively apply a restraining force against the rearward pipe length;

the pipe alignment system including a pipe joining system connected to the pipe alignment frame, the pipe joining system including a pipe seating ram adapted to exert a force against an end of the forward pipe length positioned in the pipe alignment system while the pipe restraint system applies the restraining force against the rearward pipe length joining the forward pipe length to the rearward pipe length;

a power supply mounted to the carriage, the power supply adapted to provide power to the pipe supply system and the pipe alignment system; and a control system connected to the power supply, the control system adapted to control the pipe supply system and the pipe alignment system.

2. The pipe installation device of claim 1 further comprising:

a drive system attached to the carriage, the drive system adapted for advancing the pipe installation device; and the control system adapted to control the drive system.

3. The pipe installation device of claim 1 further comprising:

a steering system connected to the carriage, the steering system adapted to steer the carriage along the course of pipeline construction; and the control system adapted to control the steering system.

4. The pipe installation device of claim 1 further comprising a bell divot system connected to the pipe alignment frame.

5. The pipe installation device of claim 1 further wherein the pipe supply system further comprises:

a pipe storage rack adapted to hold one or more pipe lengths;

a pipe release mechanism adapted to selectively release a single pipe length from the pipe storage rack; and a pipe feed system adapted to lower the pipe length released from the pipe rack onto the pipe ahgnment system.

6. The pipe installation device of claim 1 further comprising a trench sidewall sensing system connected to the carriage adapted to sense a trench sidewall and provide an output to the control system when the course of pipeline construction lies along a floor of a trench.

7. The pipe installation device of claim 1 wherein the pipe restraint system further comprises a retainer ram attached to the pipe alignment frame, the retainer ram connected to a pair of retainer forks, the pair of retainer forks pivotably mounted on a shaft, the retainer forks selectively pivotable between a down position wherein movement of a pipe length along pipe alignment frame unrestricted and an up position wherein movement of the pipe length along pipe alignment frame is restricted.

8. The pipe installation device of claim 1 wherein the pipe alignment system further comprises a plurality of V-rollers attached along a length of the pipe alignment frame.

9. A pipe installation device for installing sequential pipe lengths along a course of pipeline construction, the device comprising:

a carriage supported by a plurality of wheels;

a drive system attached to the carriage, the drive system adapted for advancing the pipe installation device; and a steering system adapted for guiding the carriage along the course of pipeline construction;

a pipe supply system attached to the carriage, the pipe supply system including a pipe storage rack adapted to hold one or more pipe lengths, a pipe release mechanism adapted to selectively release a single pipe length from the pipe storage rack and a pipe feed system adapted to lower the pipe length released from the pipe rack onto the pipe alignment system;

a pipe alignment system attached to the carriage, the pipe alignment system including a pipe alignment frame positioned to receive a forward pipe length from the pipe supply system, the pipe alignment system adapted to align the forward pipe length with a rearward pipe length positioned on the pipe alignment frame;

the pipe alignment system including a pipe restraint system connected to the pipe alignment frame, the pipe restraint system adapted to selectively apply a restraining force against the rearward pipe length;

the pipe alignment system including a pipe joining system connected to the pipe alignment frame, the pipe joining system including a pipe seating ram adapted to exert a force against an end of the forward pipe length positioned in the pipe alignment system while the pipe restraint system applies the restraining force against the rearward pipe length joining the forward pipe length to the rearward pipe length;

a power supply mounted to the pipe carriage, the power supply adapted to provide power to the pipe supply system and the pipe alignment system; and a control system adapted to control the drive system, the pipe supply system and the pipe alignment system.

10. The pipe installation device of claim 9 further comprising a bell divot system connected to the pipe alignment frame.

11. The pipe installation device of claim 9 further wherein the pipe supply system further comprises;

a pipe storage rack adapted to hold one or more pipe lengths;

a pipe release mechanism adapted to selectively release a single pipe length from the pipe storage rack; and a pipe feed system adapted to lower the pipe length released from the pipe rack onto the pipe alignment system.

12. The pipe installation device of claim 9 further comprising a trench sidewall sensing system connected to the carriage adapted to sense a trench sidewall and provide an output to the control system when the course of pipeline construction lies along a floor of a trench.

13. The pipe installation device of claim 9 wherein the pipe restraint system further comprises a retainer ram attached to the pipe alignment frame, the retainer ram connected to a pair of retainer forks, the pair of retainer forks pivotably mounted on a shaft, the retainer forks selectively pivotable between a down position wherein movement of a pipe length along pipe alignment frame unrestricted and an up position wherein movement of the pipe length along pipe alignment frame is restricted.

14. The pipe installation device of claim 9 wherein the pipe alignment system further comprises a plurality of V-rollers attached along a length of the pipe alignment frame.

15. A pipe alignment system comprising:

a pipe alignment frame including a pipe alignment frame adapted to receive a forward pipe length, the pipe alignment system adapted to align the forward pipe length along a longitudinal axis with a rearward pipe length positioned on the pipe alignment frame;

a pipe restraint system connected to the pipe alignment frame, the pipe restraint system adapted to selectively apply a restraining force against the rearward pipe length; and a pipe joining system connected to the pipe alignment frame, the pipe joining system including a pipe seating ram adapted to exert a force against an end of the forward pipe length positioned in the pipe alignment system while the pipe restraint system applies the restraining force against the rearward pipe length joining the forward pipe length to the rearward pipe length.

16. The pipe alignment system of claim 15 further comprising a bell divot system connected to the pipe alignment frame.

17. The pipe alignment system of claim 15 wherein the pipe restraint system further comprises a retainer ram attached to the pipe alignment frame, the retainer ram connected to a pair of retainer forks, the pair of retainer forks pivotably mounted on a shaft, the retainer forks selectively pivotable between a down position wherein movement of a pipe length along pipe alignment frame unrestricted and an up position wherein movement of the pipe length along pipe alignment frame is restricted.

18. The pipe alignment system of claim 15 wherein the pipe alignment system further comprises a plurality of V-rollers attached along a length of the pipe alignment frame.

* * * * *